United States Patent
Kunugi

(10) Patent No.: US 9,987,883 B2
(45) Date of Patent: Jun. 5, 2018

(54) PNEUMATIC TIRE

(71) Applicant: The Yokohama Rubber Co., LTD., Minato-ku, Tokyo (JP)

(72) Inventor: Tsuyoshi Kunugi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 337 days.

(21) Appl. No.: 14/655,320

(22) PCT Filed: Dec. 28, 2012

(86) PCT No.: PCT/JP2012/084220
§ 371 (c)(1),
(2) Date: Jun. 24, 2015

(87) PCT Pub. No.: WO2014/103069
PCT Pub. Date: Jul. 3, 2014

(65) Prior Publication Data
US 2015/0328933 A1   Nov. 19, 2015

(51) Int. Cl.
*B60C 11/01* (2006.01)
*B60C 9/20* (2006.01)
(Continued)

(52) U.S. Cl.
CPC .............. *B60C 9/2006* (2013.01); *B60C 5/00* (2013.01); *B60C 9/04* (2013.01); *B60C 9/185* (2013.01);
(Continued)

(58) Field of Classification Search
CPC ..................... B60C 11/0083; B60C 11/01
See application file for complete search history.

(56) References Cited

U.S. PATENT DOCUMENTS 3,939,890 A * 2/1976 Abe .................. B60C 11/00
152/209.13
5,616,195 A 4/1997 Marquet et al.
(Continued)

FOREIGN PATENT DOCUMENTS

CN          1826238       8/2006
JP          62-152902   * 7/1987
(Continued)

OTHER PUBLICATIONS

English machine translation of JP03-099903, no date.*
(Continued)

*Primary Examiner* — Robert C Dye
(74) *Attorney, Agent, or Firm* — Thorpe North & Western

(57) ABSTRACT

In a cross-sectional view of a pneumatic tire in the tire meridian direction, land sections, which are located on the inner side of left and right outermost circumferential main grooves in the tire width direction, have a first profile which protrudes outward in the tire radial direction. In addition, shoulder land sections, which are located on the outer side of the right and left outermost circumferential main grooves in the tire width direction, have a second profile which protrudes inward in the tire radial direction within a ground contact surface. In addition, the distance between a line extending from the first profile in the ground contact surface of the shoulder land section and the second profile in the tire radial direction increases toward the outer side in the tire width direction.

29 Claims, 16 Drawing Sheets

(51) Int. Cl.
*B60C 11/04* (2006.01)
*B60C 5/00* (2006.01)
*B60C 9/04* (2006.01)
*B60C 11/00* (2006.01)
*B60C 9/18* (2006.01)

(52) U.S. Cl.
CPC ............ *B60C 9/20* (2013.01); *B60C 11/0083* (2013.01); *B60C 11/01* (2013.01); *B60C 11/04* (2013.01); *B60C 2011/0033* (2013.01); *B60C 2200/06* (2013.01)

(56) References Cited

U.S. PATENT DOCUMENTS

| | | | |
|---|---|---|---|
| 5,660,652 A * | 8/1997 | Young | B60C 11/00 152/209.14 |
| 6,401,778 B1 | 6/2002 | Cluzel | |
| 8,146,637 B2 | 4/2012 | Radulescu et al. | |
| 8,162,018 B2 | 4/2012 | Suzuki et al. | |
| 8,752,601 B2 | 6/2014 | Takahashi et al. | |
| 2004/0069392 A1* | 4/2004 | Maruoka | B60C 3/04 152/454 |
| 2004/0154716 A1* | 8/2004 | Kimishima | B60C 11/00 152/209.14 |
| 2006/0169380 A1 | 8/2006 | Radulescu et al. | |
| 2006/0169381 A1 | 8/2006 | Radulescu et al. | |
| 2006/0169383 A1 | 8/2006 | Radulescu et al. | |
| 2008/0000566 A1* | 1/2008 | Manno | B60C 9/2006 152/527 |
| 2009/0277552 A1* | 11/2009 | Maruyama | B60C 3/04 152/454 |
| 2009/0277557 A1 | 11/2009 | Suzuki et al. | |
| 2011/0192513 A1* | 8/2011 | Hamada | B60C 3/04 152/209.18 |
| 2011/0220259 A1* | 9/2011 | Suzuki | B60C 11/00 152/209.18 |
| 2012/0018071 A1 | 1/2012 | Takahashi et al. | |
| 2012/0097307 A1 | 4/2012 | Delebecq et al. | |
| 2014/0305566 A1 | 10/2014 | Mashiyama | |
| 2014/0326375 A1* | 11/2014 | Okabe | B60C 9/0007 152/154.2 |
| 2014/0326380 A1 | 11/2014 | Kotoku | |

FOREIGN PATENT DOCUMENTS

| | | | |
|---|---|---|---|
| JP | 2002-103916 | * | 7/1987 |
| JP | 03-099903 | * | 4/1991 |
| JP | H03-99903 | | 4/1991 |
| JP | H04-66304 | | 3/1992 |
| JP | H07-1916 | | 1/1995 |
| JP | H11-512050 | | 10/1999 |
| JP | 2005-059620 | * | 3/2005 |
| JP | 2006-076359 | | 3/2006 |
| JP | 2006-528102 | | 12/2006 |
| JP | 2006-528105 | | 12/2006 |
| JP | 4008013 | | 11/2007 |
| JP | 2007-326392 | | 12/2007 |
| JP | 2008-001264 | | 1/2008 |
| JP | 4354114 | | 10/2009 |
| JP | 4553064 | | 9/2010 |
| JP | 2010-247705 | | 11/2010 |
| JP | 4918948 | | 4/2012 |
| JP | 4984013 | | 7/2012 |
| JP | 2012-522686 | | 9/2012 |
| JP | 5029787 | * | 9/2012 |
| WO | WO 97/07996 | | 3/1997 |
| WO | WO 1997/07996 | | 3/1997 |
| WO | WO 1999/24269 | | 5/1999 |
| WO | WO 2005-016666 | | 2/2005 |
| WO | WO2005-016667 | | 2/2005 |
| WO | WO 2005/016667 | | 2/2005 |
| WO | WO 2005-016668 | | 2/2005 |
| WO | WO 2007-148447 | | 12/2007 |
| WO | WO 2007/148447 | | 12/2007 |
| WO | WO 2010/058857 | | 5/2010 |
| WO | WO 2010-115891 | | 10/2010 |
| WO | WO 2010-119681 | | 10/2010 |
| WO | WO 2013-042255 | | 3/2013 |
| WO | WO 2013/042256 | | 3/2013 |

OTHER PUBLICATIONS

English machine translation of JP62-152902, no date.*
English machine translation of JP2002-103916, no date.*
English machine translation of JP2005-059620, no date.*
International Search Report for International Application No. PCT/JP2012/084220 dated Dec. 28, 2012, 4 pages, Japan.

* cited by examiner

COMPARATIVE EXAMPLE
(De/Dcc=1.00, Gsh/Gcc=1.06)

WORKING EXAMPLES
(De/Dcc=0.92, Gsh/Gcc=1.20)

|  | Conventional Example | Comparative Example 1 | Comparative Example 2 | Working Example 1 | Working Example 2 | Working Example 3 | Working Example 4 |
|---|---|---|---|---|---|---|---|
| Presence of Circumferential Reinforcing Layer | None | Yes | Yes | Yes | Yes | Yes | Yes |
| Gsh / Gcc | 1.06 | 1.06 | 1.24 | 1.06 | 1.10 | 1.20 | 1.25 |
| De / Dcc | — | 1.00 | 1.00 | 0.94 | 0.94 | 0.92 | 0.92 |
| First Profile Shape | Protruding toward outside | Protruding toward outside | Protruding toward outside | Protruding toward outside | Protruding toward outside | Protruding toward outside | Protruding toward outside |
| Second Profile Shape | Protruding toward outside | Protruding toward outside | Protruding toward outside | Protruding toward inside | Protruding toward inside | Protruding toward inside | Protruding toward inside |
| (D1 − D2) / D1 | 0.020 | 0.020 | 0.020 | 0.020 | 0.020 | 0.020 | 0.020 |
| D2 − D3 [mm] | −6 | −6 | −6 | −5 | −5 | −5 | −5 |
| Ws / Wca | — | 0.74 | 0.74 | 0.74 | 0.74 | 0.74 | 0.74 |
| Yc / Ya | 0.78 | 0.78 | 0.78 | 0.78 | 0.78 | 0.78 | 0.78 |
| Yd / Ya | — | 0.93 | 0.93 | 0.93 | 0.93 | 0.93 | 0.93 |
| Wb2 / Wca | 0.73 | 0.73 | 0.73 | 0.73 | 0.73 | 0.73 | 0.73 |
| Angle of Large-angle Belt° | 40 | 40 | 40 | 40 | 40 | 40 | 40 |
| Wb1 / Wb3 | 0.80 | 0.80 | 0.80 | 0.80 | 0.80 | 0.80 | 0.80 |
| Wsh / TW | 0.25 | 0.25 | 0.25 | 0.25 | 0.25 | 0.25 | 0.25 |
| Wg / Wca | 0.87 | 0.87 | 0.87 | 0.87 | 0.87 | 0.87 | 0.87 |
| TW / SW | 0.92 | 0.92 | 0.92 | 0.92 | 0.92 | 0.92 | 0.92 |
| TW / Wca | 0.96 | 0.96 | 0.96 | 0.93 | 0.93 | 0.93 | 0.93 |
| Tread Rubber Hardness | 58 | 58 | 58 | 58 | 58 | 58 | 58 |
| Chamfered Portion of Outermost Circumferential Main Groove | None | None | None | None | None | None | None |
| Uneven Wear Resistance Performance | 100 | 102 | 103 | 103 | 104 | 105 | 106 |

FIG. 9A

| | Working Example 5 | Working Example 6 | Working Example 7 | Working Example 8 | Working Example 9 | Working Example 10 |
|---|---|---|---|---|---|---|
| Presence of Circumferential Reinforcing Layer | Yes | Yes | Yes | Yes | Yes | Yes |
| Gsh / Gcc | 1.25 | 1.25 | 1.25 | 1.25 | 1.25 | 1.25 |
| De / Dcc | 0.65 | 0.80 | 0.95 | 0.80 | 0.80 | 0.80 |
| First Profile Shape | Protruding toward outside | Protruding toward outside | Protruding toward outside | Protruding toward outside | Protruding toward outside | Protruding toward outside |
| Second Profile Shape | Protruding toward inside | Protruding toward inside | Protruding toward inside | Protruding toward inside | Protruding toward inside | Protruding toward inside |
| (D1 − D2) / D1 | 0.015 | 0.013 | −0.015 | 0.013 | 0.013 | 0.013 |
| D2 − D3 [mm] | −4 | −2 | 23 | 0 | 7.5 | 15 |
| Ws / Wca | 0.74 | 0.74 | 0.74 | 0.74 | 0.74 | 0.74 |
| Yc / Ya | 0.78 | 0.78 | 0.78 | 0.78 | 0.78 | 0.78 |
| Yd / Ya | 0.93 | 0.93 | 0.93 | 0.93 | 0.93 | 0.93 |
| Wb2 / Wca | 0.73 | 0.73 | 0.73 | 0.73 | 0.73 | 0.73 |
| Angle of Large-angle Belt° | 40 | 40 | 40 | 40 | 40 | 40 |
| Wb1 / Wb3 | 0.80 | 0.80 | 0.80 | 0.80 | 0.80 | 0.80 |
| Wsh / TW | 0.25 | 0.25 | 0.25 | 0.25 | 0.25 | 0.25 |
| Wg / Wca | 0.87 | 0.87 | 0.87 | 0.87 | 0.87 | 0.87 |
| TW / SW | 0.92 | 0.92 | 0.92 | 0.92 | 0.92 | 0.92 |
| TW / Wca | 0.93 | 0.93 | 0.93 | 0.93 | 0.93 | 0.93 |
| Tread Rubber Hardness | 58 | 58 | 58 | 58 | 58 | 58 |
| Chamfered Portion of Outermost Circumferential Main Groove | None | None | None | None | None | None |
| Uneven Wear Resistance Performance | 107 | 108 | 106 | 110 | 112 | 111 |

FIG. 9B

| | Working Example 11 | Working Example 12 | Working Example 13 | Working Example 14 | Working Example 15 | Working Example 16 |
|---|---|---|---|---|---|---|
| Presence of Circumferential Reinforcing Layer | Yes | Yes | Yes | Yes | Yes | Yes |
| Gsh / Gcc | 1.25 | 1.25 | 1.25 | 1.25 | 1.25 | 1.25 |
| De / Dcc | 0.80 | 0.80 | 0.80 | 0.80 | 0.80 | 0.80 |
| First Profile Shape | Protruding toward outside | Protruding toward outside | Protruding toward outside | Protruding toward outside | Protruding toward outside | Protruding toward outside |
| Second Profile Shape | Protruding toward inside | Protruding toward inside | Protruding toward inside | Protruding toward inside | Protruding toward inside | Protruding toward inside |
| (D1 − D2) / D1 | 0.013 | 0.013 | 0.013 | 0.013 | 0.013 | 0.013 |
| D2 − D3 [mm] | 7.5 | 7.5 | 7.5 | 7.5 | 7.5 | 7.5 |
| Ws / Wca | 0.60 | 0.65 | 0.70 | 0.65 | 0.65 | 0.65 |
| Yc / Ya | 0.78 | 0.78 | 0.78 | 0.80 | 0.85 | 0.90 |
| Yd / Ya | 0.93 | 0.93 | 0.93 | 0.93 | 0.93 | 0.93 |
| Wb2 / Wca | 0.73 | 0.73 | 0.73 | 0.73 | 0.73 | 0.73 |
| Angle of Large-angle Belt° | 40 | 40 | 40 | 40 | 40 | 40 |
| Wb1 / Wb3 | 0.80 | 0.80 | 0.80 | 0.80 | 0.80 | 0.80 |
| Wsh / TW | 0.25 | 0.25 | 0.25 | 0.25 | 0.25 | 0.25 |
| Wg / Wca | 0.87 | 0.87 | 0.87 | 0.87 | 0.87 | 0.87 |
| TW / SW | 0.92 | 0.92 | 0.92 | 0.92 | 0.92 | 0.92 |
| TW / Wca | 0.93 | 0.93 | 0.93 | 0.93 | 0.93 | 0.93 |
| Tread Rubber Hardness | 58 | 58 | 58 | 58 | 58 | 58 |
| Chamfered Portion of Outermost Circumferential Main Groove | None | None | None | None | None | None |
| Uneven Wear Resistance Performance | 113 | 114 | 115 | 117 | 116 | 115 |

FIG. 10A

|  | Working Example 17 | Working Example 18 | Working Example 19 | Working Example 20 | Working Example 21 | Working Example 22 |
|---|---|---|---|---|---|---|
| Presence of Circumferential Reinforcing Layer | Yes | Yes | Yes | Yes | Yes | Yes |
| Gsh / Gcc | 1.25 | 1.25 | 1.25 | 1.25 | 1.25 | 1.25 |
| De / Dcc | 0.80 | 0.80 | 0.80 | 0.80 | 0.80 | 0.80 |
| First Profile Shape | Protruding toward outside | Protruding toward outside | Protruding toward outside | Protruding toward outside | Protruding toward outside | Protruding toward outside |
| Second Profile Shape | Protruding toward inside | Protruding toward inside | Protruding toward inside | Protruding toward inside | Protruding toward inside | Protruding toward inside |
| (D1 − D2) / D1 | 0.013 | 0.013 | 0.013 | 0.013 | 0.013 | 0.013 |
| D2 − D3 [mm] | 7.5 | 7.5 | 7.5 | 7.5 | 7.5 | 7.5 |
| Ws / Wca | 0.65 | 0.65 | 0.65 | 0.65 | 0.65 | 0.65 |
| Yc / Ya | 0.85 | 0.85 | 0.85 | 0.85 | 0.85 | 0.85 |
| Yd / Ya | 0.95 | 1.00 | 1.02 | 0.98 | 0.98 | 0.98 |
| Wb2 / Wca | 0.73 | 0.73 | 0.73 | 0.74 | 0.87 | 0.89 |
| Angle of Large-angle Belt° | 40 | 40 | 40 | 40 | 40 | 40 |
| Wb1 / Wb3 | 0.80 | 0.80 | 0.80 | 0.80 | 0.80 | 0.80 |
| Wsh / TW | 0.25 | 0.25 | 0.25 | 0.25 | 0.25 | 0.25 |
| Wg / Wca | 0.87 | 0.87 | 0.87 | 0.87 | 0.87 | 0.87 |
| TW / SW | 0.92 | 0.92 | 0.92 | 0.92 | 0.92 | 0.92 |
| TW / Wca | 0.93 | 0.93 | 0.93 | 0.93 | 0.93 | 0.93 |
| Tread Rubber Hardness | 58 | 58 | 58 | 58 | 58 | 58 |
| Chamfered Portion of Outermost Circumferential Main Groove | None | None | None | None | None | None |
| Uneven Wear Resistance Performance | 116 | 117 | 116 | 116 | 117 | 118 |

FIG. 10B

| | Working Example 23 | Working Example 24 | Working Example 25 | Working Example 26 | Working Example 27 |
|---|---|---|---|---|---|
| Presence of Circumferential Reinforcing Layer | Yes | Yes | Yes | Yes | Yes |
| Gsh / Gcc | 1.25 | 1.25 | 1.25 | 1.25 | 1.25 |
| De / Dcc | 0.80 | 0.80 | 0.80 | 0.80 | 0.80 |
| First Profile Shape | Protruding toward outside | Protruding toward outside | Protruding toward outside | Protruding toward outside | Protruding toward outside |
| Second Profile Shape | Protruding toward inside | Protruding toward inside | Protruding toward inside | Protruding toward inside | Protruding toward inside |
| (D1 − D2) / D1 | 0.013 | 0.013 | 0.013 | 0.013 | 0.013 |
| D2 − D3 [mm] | 7.5 | 7.5 | 7.5 | 7.5 | 7.5 |
| Ws / Wca | 0.65 | 0.65 | 0.65 | 0.65 | 0.65 |
| Yc / Ya | 0.85 | 0.85 | 0.85 | 0.85 | 0.85 |
| Yd / Ya | 0.98 | 0.98 | 0.98 | 0.98 | 0.98 |
| Wb2 / Wca | 0.87 | 0.87 | 0.87 | 0.87 | 0.87 |
| Angle of Large-angle Belt° | 45 | 50 | 70 | 50 | 50 |
| Wb1 / Wb3 | 0.80 | 0.80 | 0.80 | 0.85 | 0.95 |
| Wsh / TW | 0.25 | 0.25 | 0.25 | 0.25 | 0.25 |
| Wg / Wca | 0.87 | 0.87 | 0.87 | 0.87 | 0.87 |
| TW / SW | 0.92 | 0.92 | 0.92 | 0.92 | 0.92 |
| TW / Wca | 0.93 | 0.93 | 0.93 | 0.93 | 0.93 |
| Tread Rubber Hardness | 58 | 58 | 58 | 58 | 58 |
| Chamfered Portion of Outermost Circumferential Main Groove | None | None | None | None | None |
| Uneven Wear Resistance Performance | 117 | 118 | 119 | 117 | 118 |

FIG. 11A

| | Working Example 28 | Working Example 29 | Working Example 30 | Working Example 31 |
|---|---|---|---|---|
| Presence of Circumferential Reinforcing Layer | Yes | Yes | Yes | Yes |
| Gsh / Gcc | 1.25 | 1.25 | 1.25 | 1.25 |
| De / Dcc | 0.80 | 0.80 | 0.80 | 0.80 |
| First Profile Shape | Protruding toward outside | Protruding toward outside | Protruding toward outside | Protruding toward outside |
| Second Profile Shape | Protruding toward inside | Protruding toward inside | Protruding toward inside | Protruding toward inside |
| (D1 − D2) / D1 | 0.013 | 0.013 | 0.013 | 0.013 |
| D2 − D3 [mm] | 7.5 | 7.5 | 7.5 | 7.5 |
| Ws / Wca | 0.65 | 0.65 | 0.65 | 0.65 |
| Yc / Ya | 0.85 | 0.85 | 0.85 | 0.85 |
| Yd / Ya | 0.98 | 0.98 | 0.98 | 0.98 |
| Wb2 / Wca | 0.87 | 0.87 | 0.87 | 0.87 |
| Angle of Large-angle Belt° | 50 | 50 | 50 | 50 |
| Wb1 / Wb3 | 1.05 | 0.95 | 0.95 | 0.95 |
| Wsh / TW | 0.25 | 0.1 | 0.15 | 0.20 |
| Wg / Wca | 0.87 | 0.87 | 0.87 | 0.87 |
| TW / SW | 0.92 | 0.92 | 0.92 | 0.92 |
| TW / Wca | 0.93 | 0.93 | 0.93 | 0.93 |
| Tread Rubber Hardness | 58 | 58 | 58 | 58 |
| Chamfered Portion of Outermost Circumferential Main Groove | None | None | None | None |
| Uneven Wear Resistance Performance | 117 | 118 | 119 | 120 |

FIG. 11B

| | Working Example 32 | Working Example 33 | Working Example 34 | Working Example 35 | Working Example 36 | Working Example 37 |
|---|---|---|---|---|---|---|
| Presence of Circumferential Reinforcing Layer | Yes | Yes | Yes | Yes | Yes | Yes |
| Gsh / Gcc | 1.25 | 1.25 | 1.25 | 1.25 | 1.25 | 1.25 |
| De / Dcc | 0.80 | 0.80 | 0.80 | 0.80 | 0.80 | 0.80 |
| First Profile Shape | Protruding toward outside | Protruding toward outside | Protruding toward outside | Protruding toward outside | Protruding toward outside | Protruding toward outside |
| Second Profile Shape | Protruding toward inside | Protruding toward inside | Protruding toward inside | Protruding toward inside | Protruding toward inside | Protruding toward inside |
| (D1 − D2) / D1 | 0.013 | 0.013 | 0.013 | 0.013 | 0.013 | 0.013 |
| D2 − D3 [mm] | 7.5 | 7.5 | 7.5 | 7.5 | 7.5 | 7.5 |
| Ws / Wca | 0.65 | 0.65 | 0.65 | 0.65 | 0.65 | 0.65 |
| Yc / Ya | 0.85 | 0.85 | 0.85 | 0.85 | 0.85 | 0.85 |
| Yd / Ya | 0.98 | 0.98 | 0.98 | 0.98 | 0.98 | 0.98 |
| Wb2 / Wca | 0.87 | 0.87 | 0.87 | 0.87 | 0.87 | 0.87 |
| Angle of Large-angle Belt° | 50 | 50 | 50 | 50 | 50 | 50 |
| Wb1 / Wb3 | 0.95 | 0.95 | 0.95 | 0.95 | 0.95 | 0.95 |
| Wsh / TW | 0.15 | 0.15 | 0.15 | 0.15 | 0.15 | 0.15 |
| Wg / Wca | 0.64 | 0.74 | 0.84 | 0.74 | 0.74 | 0.74 |
| TW / SW | 0.92 | 0.92 | 0.92 | 0.80 | 0.87 | 0.89 |
| TW / Wca | 0.93 | 0.93 | 0.93 | 0.93 | 0.93 | 0.93 |
| Tread Rubber Hardness | 58 | 58 | 58 | 58 | 58 | 58 |
| Chamfered Portion of Outermost Circumferential Main Groove | None | None | None | None | None | None |
| Uneven Wear Resistance Performance | 119 | 120 | 121 | 121 | 122 | 123 |

FIG. 12A

| | Working Example 38 | Working Example 39 | Working Example 40 | Working Example 41 | Working Example 42 |
|---|---|---|---|---|---|
| Presence of Circumferential Reinforcing Layer | Yes | Yes | Yes | Yes | Yes |
| Gsh / Gcc | 1.25 | 1.25 | 1.25 | 1.25 | 1.25 |
| De / Dcc | 0.80 | 0.80 | 0.80 | 0.80 | 0.80 |
| First Profile Shape | Protruding toward outside | Protruding toward outside | Protruding toward outside | Protruding toward outside | Protruding toward outside |
| Second Profile Shape | Protruding toward inside | Protruding toward inside | Protruding toward inside | Protruding toward inside | Protruding toward inside |
| (D1 − D2) / D1 | 0.013 | 0.013 | 0.013 | 0.013 | 0.013 |
| D2 − D3 [mm] | 7.5 | 7.5 | 7.5 | 7.5 | 7.5 |
| Ws / Wca | 0.65 | 0.65 | 0.65 | 0.65 | 0.65 |
| Yc / Ya | 0.85 | 0.85 | 0.85 | 0.85 | 0.85 |
| Yd / Ya | 0.98 | 0.98 | 0.98 | 0.98 | 0.98 |
| Wb2 / Wca | 0.87 | 0.87 | 0.87 | 0.87 | 0.87 |
| Angle of Large-angle Belt° | 50 | 50 | 50 | 50 | 50 |
| Wb1 / Wb3 | 0.95 | 0.95 | 0.95 | 0.95 | 0.95 |
| Wsh / TW | 0.15 | 0.15 | 0.15 | 0.15 | 0.15 |
| Wg / Wca | 0.74 | 0.74 | 0.74 | 0.74 | 0.74 |
| TW / SW | 0.87 | 0.87 | 0.92 | 0.92 | 0.92 |
| TW / Wca | 0.91 | 0.82 | 0.93 | 0.93 | 0.93 |
| Tread Rubber Hardness | 58 | 58 | 60 | 67 | 67 |
| Chamfered Portion of Outermost Circumferential Main Groove | None | None | None | None | Yes |
| Uneven Wear Resistance Performance | 123 | 124 | 120 | 122 | 123 |

FIG. 12B

PNEUMATIC TIRE

TECHNICAL FIELD

The present technology relates to a pneumatic tire, and particularly relates to a pneumatic tire with improved uneven wear resistance performance.

BACKGROUND

In recent years, heavy duty tires mounted on trucks, buses, and the like maintain the shape of a tread portion due to the tires having a low aspect ratio while having a circumferential reinforcing layer disposed in a belt layer. The circumferential reinforcing layer is a belt ply having a belt angle that is substantially 0° with respect to the tire circumferential direction, and is disposed so as to be stacked upon a pair of cross belts. The technologies disclosed in Japanese Patent Nos. 4642760, 4663638 and 4663639, as well as in Japanese Unexamined Patent Application Publication No. 2012-522686, are conventional pneumatic tires that are configured in this manner.

A pneumatic tire has a problem in that uneven wear of a shoulder land section must be prevented.

SUMMARY

The present technology provides a pneumatic tire with improved tire uneven wear resistance performance.

A pneumatic tire pertaining to the present technology is provided with a carcass layer, a belt layer disposed on an outer side of the carcass layer in a tire radial direction, a tread rubber disposed on an outer side of the belt layer in the tire radial direction, at least three circumferential main grooves extending in a tire circumferential direction, and a plurality of land sections partitioned and formed by the circumferential main grooves. The belt layer is formed by laminating a pair of cross belts each having a belt angle with an absolute value of not less than 10° and not more than 45° and having mutually opposite signs, and a circumferential reinforcing layer having a belt angle within a range of ±5° with respect to the tire circumferential direction. Among the circumferential main grooves, circumferential main grooves that are outermost to the left and right in a tire width direction are termed outermost circumferential main grooves. In a cross-sectional view taken along a tire meridian direction, one of the land sections that is closer to an inner side in the tire width direction than the outermost circumferential main grooves to the left and right has a first profile that protrudes toward the outer side in the tire radial direction, and another one of the land sections that is closer to the outer side in the tire width direction than the outermost circumferential main grooves to the left and right (hereinafter termed a shoulder land section) has a second profile that protrudes toward the inner side in the tire radial direction within a ground contact surface. A distance d in the tire radial direction between a line extending from the first profile within the ground contact surface of the shoulder land section and the second profile increases toward the outer side in the tire width direction.

According to the pneumatic tire pertaining to the present technology, the shoulder land section has the second profile PL2 that protrudes toward the inner side in the tire radial direction within the ground contact surface. Also, the distance d between the first profile PL1 and the second profile PL2 within the ground contact surface of the shoulder land section increases toward the outer side in the tire width direction. As a result, the ground contact pressure increases on the side of a ground contact edge T of the shoulder land section when the tire comes into contact with the ground. As such, an amount of slippage at a center region of the land section and an amount of slippage at the shoulder land section are averaged when the tire comes into contact with the ground. As a result, there is an advantage in that uneven wear of the shoulder land section is suppressed, which serves to improve the uneven wear resistance performance of the tire.

BRIEF DESCRIPTION OF THE DRAWINGS

FIGS. 9A-9B include a table showing results of performance testing of pneumatic tires according to the embodiment of the present technology.

FIGS. 10A-10B include a table showing results of performance testing of pneumatic tires according to the embodiment of the present technology.

FIGS. 11A-11B include a table showing results of performance testing of pneumatic tires according to the embodiment of the present technology.

FIGS. 12A-12B include a table showing results of performance testing of pneumatic tires according to the embodiment of the present technology.

DETAILED DESCRIPTION

The present technology is described in detail below, with reference to the accompanying drawings. However, the present technology is not limited to these embodiments. Moreover, components that can possibly or obviously be substituted while maintaining consistency with the present technology are included as components of the embodiments. Furthermore, a plurality of modified examples that are described in the embodiment may be freely combined within the scope of obviousness for a person skilled in the art.

Pneumatic Tire

Figure 1:
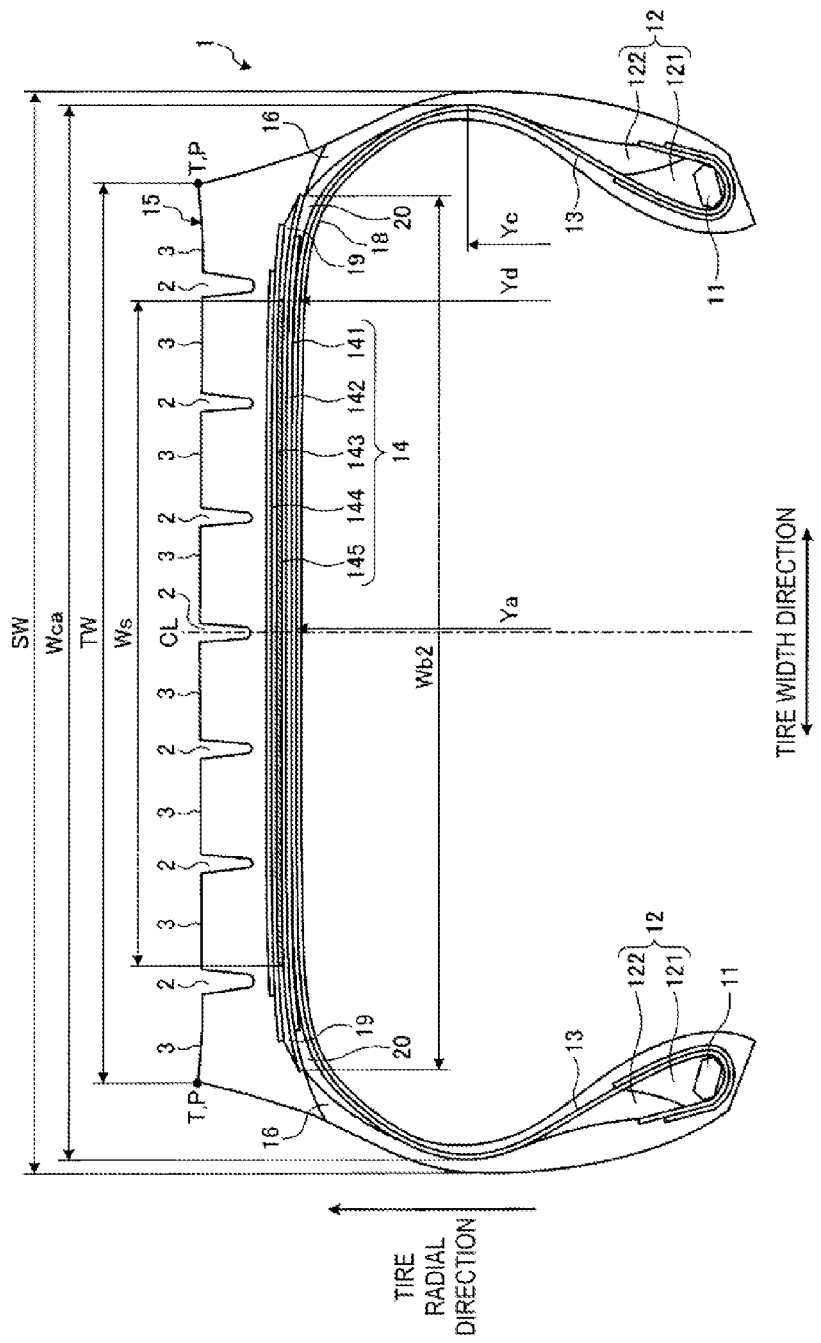
FIG. 1 is a cross-sectional view taken along a tire meridian direction illustrating a pneumatic tire according to an embodiment of the present technology.

FIG. 1 is a cross-sectional view taken along a tire meridian direction illustrating a pneumatic tire according to an embodiment of the present technology. In this drawing, a radial tire for heavy loads that is mounted on a truck, a bus, or the like for long-distance transport is illustrated as an example of the pneumatic tire 1. Note that the reference sign CL refers to a tire equatorial plane. Moreover, a tread edge P and a tire ground contact edge T are in accord with each other in FIG. 1. A circumferential reinforcing layer 145 is indicated by hatching in FIG. 1.

The pneumatic tire 1 includes a pair of bead cores 11, 11, a pair of bead fillers 12, 12, a carcass layer 13, a belt layer 14, a tread rubber 15, and a pair of side wall rubbers 16, 16 (see FIG. 1).

The pair of bead cores 11, 11 has an annular structure and constitute cores of left and right bead portions. The pair of bead fillers 12, 12 is formed from a lower filler 121 and an upper filler 122, and is respectively disposed on a periphery of the pair of bead cores 11, 11 in a tire radial direction so as to reinforce the bead portions.

The carcass layer 13 extends in toroidal form between the bead cores 11, 11 on the left and right, forming a skeleton for the tire. Additionally, both end portions of the carcass layer 13 are turned back from an inner side in a tire width direction toward an outer side in the tire width direction and are fixed so as to wrap around the bead cores 11 and the bead fillers 12. Also, the carcass layer 13 is constituted by a plurality of carcass cords formed from steel or an organic fiber material (e.g. nylon, polyester, rayon, or the like) covered by a coating rubber and subjected to a rolling process, and has a carcass angle (an angle of inclination of the fiber direction of the carcass cord with respect to a tire circumferential direction) having an absolute value of not less than 85° and not more than 95°.

The belt layer 14 is formed by laminating a plurality of belt plies 141-145, and is disposed extended over a periphery of the carcass layer 13. The specific configuration of the belt layer 14 is described below.

The tread rubber 15 is disposed on an outer circumference of the carcass layer 13 and the belt layer 14 in the tire radial direction, and forms a tread portion of the tire. The pair of side wall rubbers 16, 16 is disposed on the outer sides of the carcass layer 13 in the tire width direction, so as to form left and right side wall portions of the tire.

In the configuration illustrated in FIG. 1, the pneumatic tire 1 includes seven circumferential main grooves 2 that extend in the tire circumferential direction, and eight land sections 3 partitioned and formed by the circumferential main grooves 2. The land sections 3 are each formed of ribs that are continuous in the tire circumferential direction or blocks that are segmented in the circumferential direction by lug grooves (not illustrated).

Here, the term circumferential main groove refers to a circumferential groove having a groove width of 5.0 mm or greater. The groove width of the circumferential main groove is measured excluding any notched portions and/or chamfered portions formed at a groove opening portion.

Additionally, in the pneumatic tire 1, the circumferential main grooves 2, 2 that are outermost at the left and right in the tire width direction are referred to as outermost circumferential main grooves. Moreover, the land sections 3, 3 to the left and right on the outer side in the tire width direction that are defined by the left and right outermost circumferential main grooves 2, 2 are referred to as shoulder land sections.

Belt Layer

Figure 2:
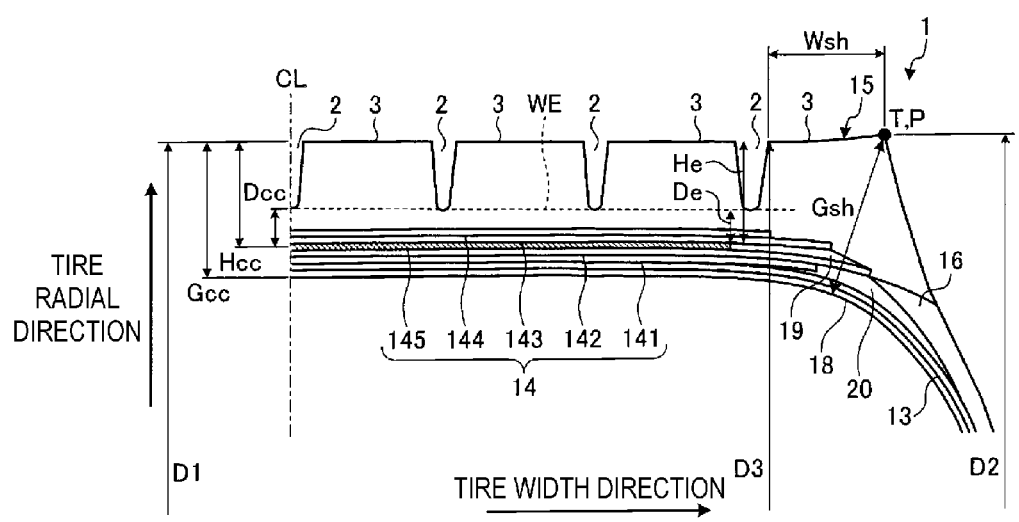
FIG. 2 is an explanatory view illustrating a belt layer of the pneumatic tire depicted in FIG. 1.
Figure 3:
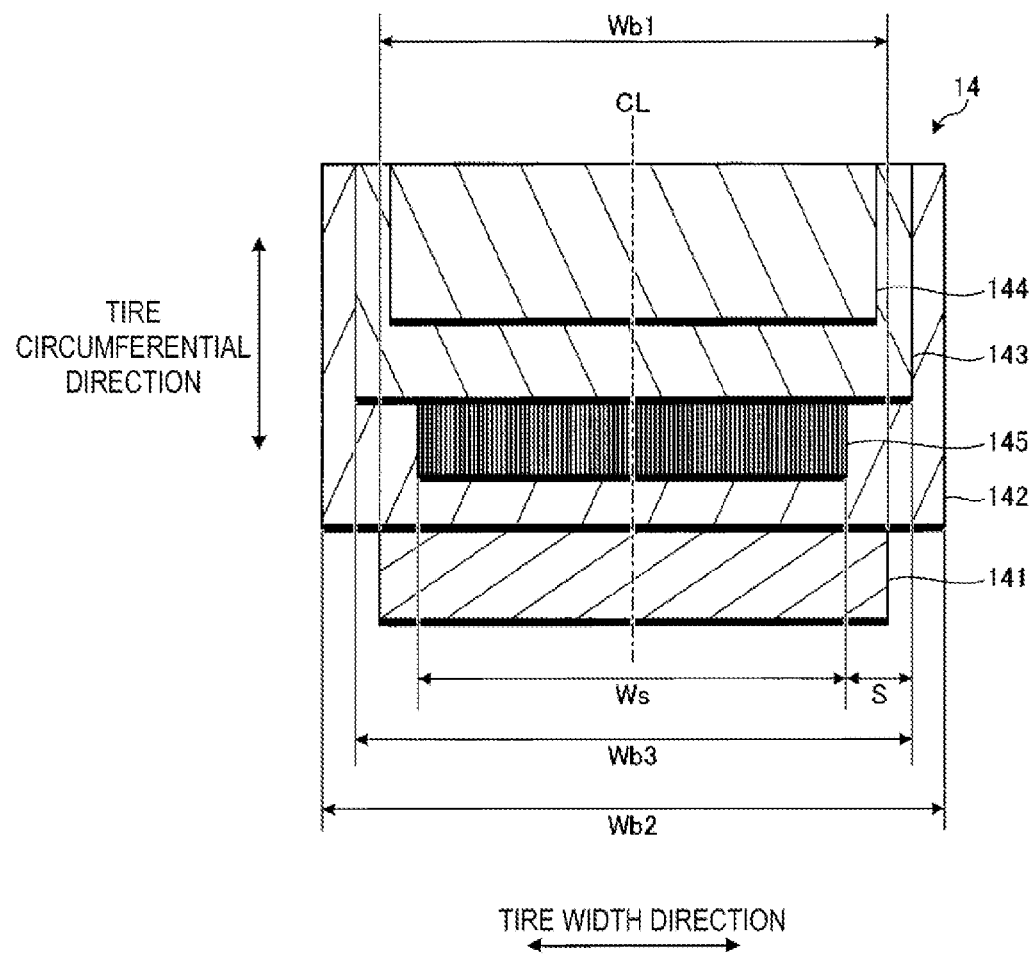
FIG. 3 is an explanatory view illustrating the belt layer of the pneumatic tire depicted in FIG. 1.

FIG. 2 and FIG. 3 are explanatory views illustrating a belt layer of the pneumatic tire depicted in FIG. 1. In these drawings, FIG. 2 illustrates an area on one side of a tread portion demarcated by the tire equatorial plane CL, and FIG. 3 illustrates a laminated structure of the belt layer 14. Furthermore, the thin lines in the belt plies 141-145 in FIG. 3 schematically represent the respective belt cords of the belt plies 141-145.

The belt layer 14 is formed by laminating a large-angle belt 141, a pair of cross belts 142, 143, a belt cover 144, and a circumferential reinforcing layer 145, and is disposed by being wound and mounted onto the periphery of the carcass layer 13 (see FIG. 2).

The large-angle belt 141 is configured by a plurality of belt cords formed from steel or an organic fiber material, covered by coating rubber, and subjected to a rolling process, having a belt angle (an angle of inclination of the fiber direction of the belt cords with respect to the tire circumferential direction) having an absolute value of not less than 45° and not more than 70°. Moreover, the large-angle belt 141 is disposed so as to be laminated on the outside in the tire radial direction of the carcass layer 13.

The pair of cross belts 142, 143 are configured by a plurality of belt cords formed from steel or an organic fiber material, covered by coating rubber, and subjected to a rolling process, having a belt angle having an absolute value of not less than 10° and not more than 45°. Additionally, the pair of cross belts 142, 143 have belt angles that are of mutually opposite signs to each other, and are laminated so that the fiber directions of the belt cords intersect each other (a crossply structure). In the following description, the cross belt 142 positioned on the inner side in the tire radial direction is referred to as an inner-side cross belt, and the cross belt 143 positioned on the outer side in the tire radial direction is referred to as an outer-side cross belt. Three or more cross belts may be disposed so as to be laminated (not illustrated). In addition, in the present embodiment, the pair of cross belts 142, 143 are disposed so as to be laminated on the outer side of the large-angle belt 141 in the tire radial direction.

Also, the belt cover 144 is configured by a plurality of belt cords formed from steel or an organic fiber material, covered by coating rubber, and subjected to a rolling process, having a belt angle having an absolute value of not less than 10° and not more than 45°. In addition, the belt cover 144 is disposed so as to be laminated on the outer side of the pair of cross belts 142, 143 in the tire radial direction. Moreover, in this embodiment, the belt cover 144 has the same belt angle as the outer-side cross belt 143, and is disposed in the outermost layer of the belt layer 14.

The circumferential reinforcing layer 145 is configured by belt cords formed from steel, and covered by coating rubber that are wound in a spiral manner with an inclination within a range of ±5° with respect to the tire circumferential direction. In addition, the circumferential reinforcing layer 145 is disposed so as to be interposed between the pair of cross belts 142, 143 in the present embodiment. Additionally, the circumferential reinforcing layer 145 is disposed at the inside of left and right edge portions of the pair of cross belts 142, 143 in the tire width direction. Specifically, the circumferential reinforcing layer 145 is formed by winding one or a plurality of wires in a spiral manner around the periphery of the inner-side cross belt 142. This circumferential reinforcing layer 145 reinforces the stiffness in the tire circumferential direction. As a result, the tire durability is improved.

Here, in the pneumatic tire 1, the belt layer 14 may have an edge cover (not illustrated). Generally, the edge cover is configured by a plurality of belt cords formed from steel or an organic fiber material covered by coating rubber and subjected to a rolling process, having a belt angle having an absolute value of not less than 0° and not more than 5°. Additionally, the edge cover is disposed on the outside of the left and right edge portions of the outer-side cross belt 143 (or of the inner-side cross belt 142) in the tire radial direction. The difference in radial growth between a center region and a shoulder region of the tread portion is reduced and uneven wear resistance performance of the tire is improved due to a fastening effect demonstrated by the edge cover.

Additionally, in the configuration illustrated in FIG. 2, the circumferential reinforcing layer 145 is disposed so as to be interposed between the pair of cross belts 142, 143 (see FIG. 2). However, the circumferential reinforcing layer 145 is not limited as such, and may also disposed on the outer side of the pair of cross belts 142, 143 in the tire radial direction (not illustrated). Additionally, the circumferential reinforcing layer 145 may also be disposed on the inner side of the pair of cross belts 142, 143. For example, the circumferential reinforcing layer 145 may be (1) disposed between the large-angle belt 141 and the inner-side cross belt 142, or (2) disposed between the carcass layer 13 and the large-angle belt 141 (not illustrated).

Improved Uneven Wear Resistance Performance

Recent heavy duty tires mounted on trucks, buses, and the like maintain the shape of the tread portion due to the tires having a low aspect ratio while having a circumferential reinforcing layer disposed in the belt layer. Specifically, by disposing the circumferential reinforcing layer at the tread center region, and exploiting a fastening effect thereof, radial growth of the tread is suppressed and the tread shape is maintained.

According to this configuration, the above-described fastening effect may be produced within a setting range of the circumferential reinforcing layer. However, in contrast, the stiffness in the tire circumferential direction is relatively insufficient outside the setting range of the circumferential reinforcing layer (in a region at the outside in the tire width direction). As such, during rolling motion of the tire, greater slippage occurs at the shoulder land section, which poses the problem of uneven wear occurring at the shoulder land section.

Thus, this pneumatic tire 1 uses the following configuration in order to suppress the uneven wear in the shoulder land section (see FIGS. 1 to 3).

First, as illustrated in FIG. 2, a wear end surface WE of the circumferential main groove 2 is drawn as viewed in a cross-section taken along the tire meridian direction. The term wear end surface WE refers to a surface estimated from a wear indicator present in the tire. Additionally, the wear end surface WE is measured under the condition of a single tire with the tire in a non-inflated state. In a typical pneumatic tire, the wear end surface WE is on a curve that is substantially parallel to a tread profile.

Here, a distance Dcc from the circumferential reinforcing layer 145 to the wear end surface WE and a distance De from an end portion of the circumferential reinforcing layer 145 to the wear end surface WE, each measured in the tire equatorial plane CL, preferably have a relationship such that De/Dcc≤0.94, and more preferably have a relationship such that De/Dcc≤0.92. The lower limit for the ratio De/Dcc is not particularly limited. However, the lower limit is restricted by a groove bottom tread gauge of an outer groove becoming insufficiently secured, and by worsening of groove crack resistance performance. For example, the lower limit of the ratio De/Dcc is preferably within a range such that 0.65≤De/Dcc.

The distance Dcc and the distance De are measured under the condition of a single tire with the tire in a non-inflated state. Additionally, the measurement point on the circumferential reinforcing layer 145 side is defined by a curve connecting the center points of the belt cords that constitute the circumferential reinforcing layer 145, when viewed as the cross-section taken along the tire meridian direction.

Moreover, the end portion of the circumferential reinforcing layer 145 is defined using the belt cord on the outermost side in the tire width direction among the belt cords that constitute the circumferential reinforcing layer 145.

Herein, the term specified rim refers to an applicable rim as defined by the Japan Automobile Tyre Manufacturers Association (JATMA), a design rim as defined by the Tire and Rim Association (TRA), or a measuring rim defined by the European Tyre and Rim Technical Organisation (ETRTO). The term specified inner pressure refers to maximum air pressure as stipulated by JATMA, a maximum value in Tire Load Limits at various Cold Inflation Pressures as defined by TRA, and Inflation Pressures as stipulated by ETRTO. Note also that the term specified load refers to a maximum load capacity stipulated by JATMA, a maximum value in Tire Load Limits at various Cold Inflation Pressures as defined by TRA, and a Load Capacity as stipulated by ETRTO. However, with JATMA, in the case of passenger car tires, the specified inner pressure is an air pressure of 180 kPa, and the specified load is 88% of the maximum load capacity.

Moreover, the distance Gcc from the tread profile to a tire inner circumferential surface and the distance Gsh from a tread edge P to the tire inner circumferential surface, each measured in the tire equatorial plane CL, preferably have a relationship such that 1.10≤Gsh/Gcc, and more preferably have a relationship such that 1.20≤Gsh/Gcc.

Figure 6:
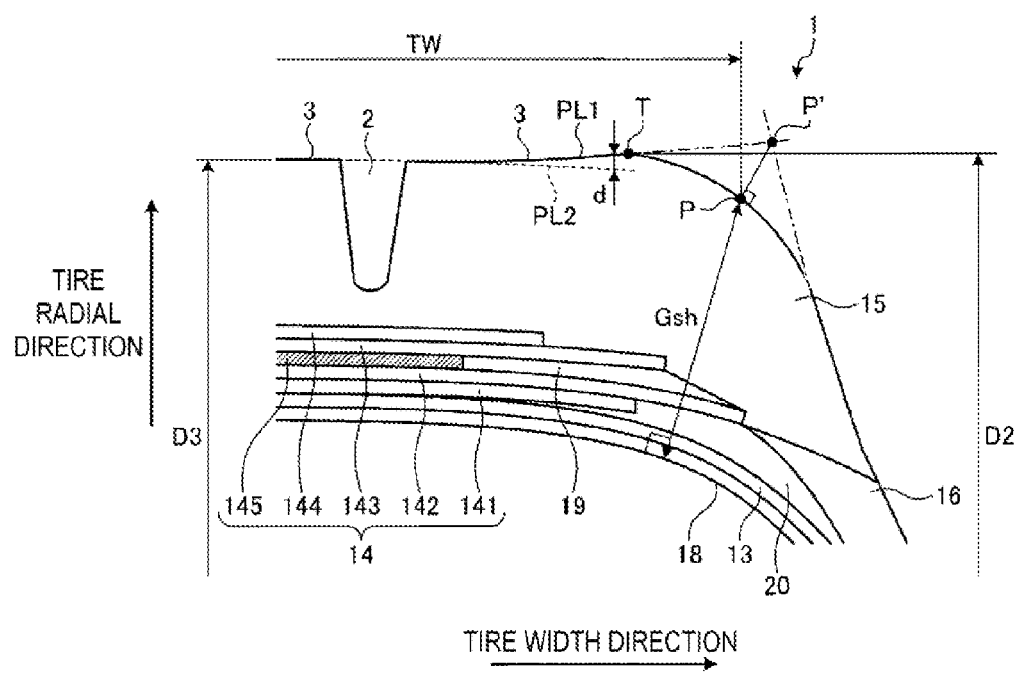
FIG. 6 is an explanatory view illustrating a modified example of the pneumatic tire depicted in FIG. 1.

The upper limit of the ratio Gsh/Gcc is not particularly limited. However, the upper limit of the ratio Gsh/Gcc is preferably defined such that a radius at the tread edge P of the tread profile is equal to or less than the radius at the tire equatorial plane CL when the tire is mounted on a specified rim, inflated to the specified inner pressure, and is in an unloaded state. That is, the upper limit of the ratio Gsh/Gcc is preferably defined such that the tread profile has a curved shape centered on the inner side in the tire radial direction or has a straight linear shape, and does not form an inverse R shape (i.e., a curved shape centered on the outer side in the tire radial direction). For example, in a configuration having a square shaped shoulder portion as illustrated in FIG. 2, the upper limit of the ratio Gsh/Gcc is on the order of from 1.4 to 1.5. Conversely, in a configuration having a round shaped shoulder portion as illustrated in FIG. 6, as described later, the upper limit of the ratio Gsh/Gcc is on the order of from 1.3 to 1.4.

The distance Gcc is measured as the distance from the intersection between the tire equatorial plane CL and the tread profile to the intersection between the tire equatorial plane CL and the tire inner circumferential surface when viewed in a cross-sectional view taken along the tire meridian direction. Therefore, in a configuration having a circumferential main groove 2 at the tire equatorial plane CL, such as the configuration illustrated in FIG. 1 and FIG. 2, the distance Gcc is measured omitting the circumferential main groove 2. The distance Gsh is measured as the length of a perpendicular line from the tread edge P to the tire inner circumferential surface when viewed in the cross-sectional view taken along the tire meridian direction.

In the configuration illustrated in FIG. 2, the pneumatic tire 1 includes an inner liner 18 on the inner circumferential surface of the carcass layer 13, and the inner liner 18 is disposed across the entire region of the tire inner circumferential surface. In such a configuration, the distance Gcc and the distance Gsh are measured on the basis of the surface of the inner liner 18 (tire inner circumferential surface).

The tread edge P refers to (1) a point of the tread edge portion in a configuration having a square shaped shoulder portion. For example, in the configuration illustrated in FIG. 2, the tread edge P and a tire ground contact edge T are in accord with each other due to the shoulder portion having a square shape. Conversely, (2) as illustrated in FIG. 6 where the shoulder portion has a round shape, an intersection P' is taken from the profile of the tread portion and the profile of a side wall portion when viewed as a cross-section from the tire meridian direction, and the tread edge P is taken as the bottom of a perpendicular line drawn from the intersection P' to the shoulder portion.

Additionally, the tire ground contact edge T refers to a maximum width position in a tire axial direction of a contact surface between the tire and a flat plate in a configuration in which the tire is mounted on a specified rim, inflated to the specified inner pressure, placed perpendicularly to the flat plate in a static state, and loaded with a load corresponding to a specified load.

Figure 4:
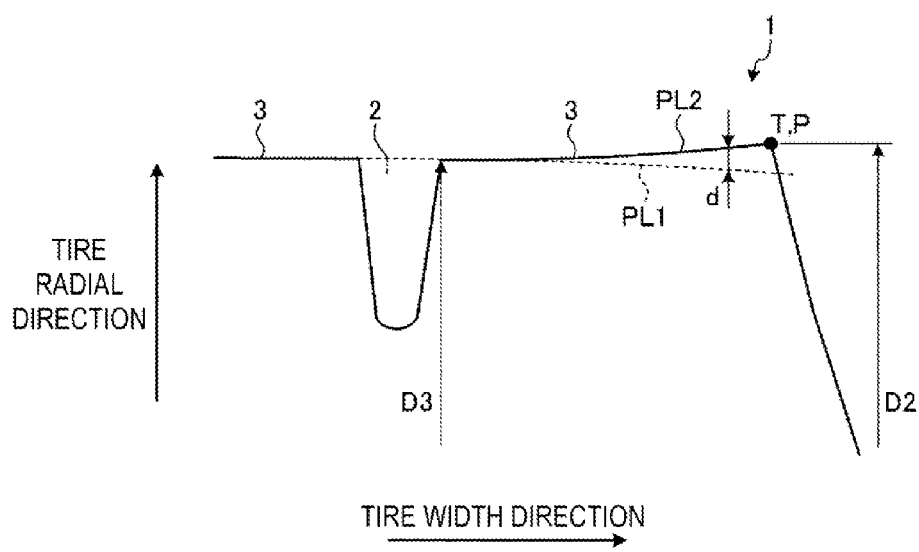
FIG. 4 is a magnified view illustrating a shoulder land section of the pneumatic tire depicted in FIG. 1.

FIG. 4 is a magnified view diagram depicting the shoulder land section 3 of the pneumatic tire 1 described in FIG. 1. FIG. 4 illustrates the relationship between a line extending from a first profile PL1 of the land section 3 in a center region, and a second profile PL2 of the shoulder land section 3.

As illustrated in FIG. 4, in the pneumatic tire 1, as seen in the cross-sectional view taken along the tire meridian direction, the center land section 3, located closer to the inner side in the tire width direction than the left and right outermost circumferential main grooves 2, 2, and a second land section 3 each have the first profile PL1, which protrudes toward the outer side in the tire radial direction. In addition, the shoulder land section 3, located closer to the outer side than the left and right outermost circumferential main grooves in the tire width direction, has the second profile PL2, which protrudes toward the inner side in the tire radial direction within a ground contact surface.

Each of the first profile PL1 and the second profile PL2 is preferably a smooth curve formed from a single arc or from a plurality of arcs in combination. However, no such limitation is intended. The first profile PL1 and the second profile PL2 may also have a configuration that partially includes straight lines.

In addition, a distance d in the tire radial direction between the line extending from the first profile PL1 in the ground contact surface of the shoulder land section 3 and the second profile PL2 increases toward the outer side in the tire width direction.

For example, in the configuration of FIG. 4, the first profile PL1 of the center land section 3 and the second land section 3 is formed as a single arc that protrudes toward the outer side in the tire radial direction. The first profile PL1 has a maximum diameter D1 in the tire equatorial plane CL, and the diameter diminishes as it approaches the outer side in the tire width direction. Conversely, the second profile PL2 of the shoulder land section 3 is formed as a single arc that protrudes toward the inner side in the tire radial direction. The second profile PL2 has a minimum diameter D3 at an end portion of the shoulder land section 3 on the inner side in the tire width direction, and the diameter increases as it approaches the outer side in the tire width direction. As a result, the shoulder land section 3 has a ground contact surface shape that rises upward on the outer side in the tire radial direction as it approaches the outer side in the tire width direction. Accordingly, the second profile PL2 of the shoulder land section 3 separates from the outer side in the tire radial direction as it approaches the outer side in the tire width direction, relative to the line extending from the first profile PL1 of the center land section 3 and the second land section 3. In addition, the distance d between the profiles PL1, PL2 increases monotonically as it approaches the outer side in the tire width direction.

Moreover, the profile shape and the diameters of the profile are measured when the tire is mounted on a specified rim, inflated to the specified inner pressure, and is in an unloaded state. In addition, the diameters of the profile are measured as respective diameters of the profile as centered on the tire rotational axis.

Additionally, in the above-described configuration, the diameter D1 of the first profile PL1 at the tire equatorial plane CL and the diameter D2 of the second profile PL2 at the tire ground contact edge T preferably have a relationship such that $-0.015 \leq (D1-D2)/D1 \leq 0.015$. That is, the diameter of the profile for the tire as a whole is preferably substantially equal at the tire equatorial plane CL and the tire ground contact edge T.

In addition, the diameter D2 of the second profile PL2 at the tire ground contact edge T and a diameter D3 of the second profile PL2 at the edge portion of the shoulder land section 3 on the inner side in the tire width direction preferably have a relationship such that D3<D2. Also, these diameters D2, D3 preferably have a relationship such that $0.0 \text{ mm} \leq D2-D3 \leq 15.0 \text{ mm}$. Accordingly, as illustrated in FIG. 4, the shoulder land section 3 preferably has a ground contact surface shape that rises upward toward the outer side in the tire radial direction as it approaches the outer side in the tire width direction.

However, no such limitation is intended. The diameter D2 of the second profile PL2 at the tire ground contact edge T and the diameter D3 of the second profile PL2 at the edge portion of the shoulder land section 3 on the inner side in the tire width direction preferably have a relationship such that D2≤D3. As a result, the shoulder land section 3 has a ground contact surface shape that is flat, or has a ground contact surface shape with shoulder dropping as it approaches the outer side in the tire width direction.

Figure 5A:
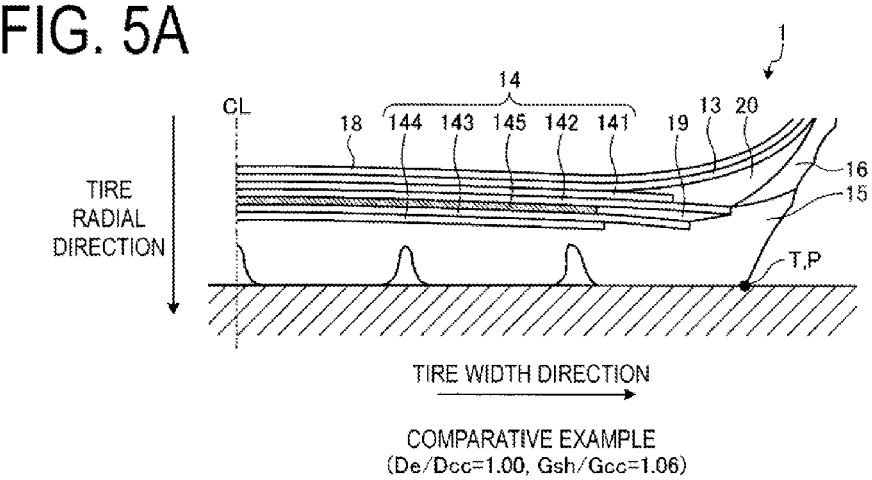
FIGS. 5A and 5B are explanatory views illustrating the effect of the pneumatic tire depicted in FIG. 1.
Figure 5B:
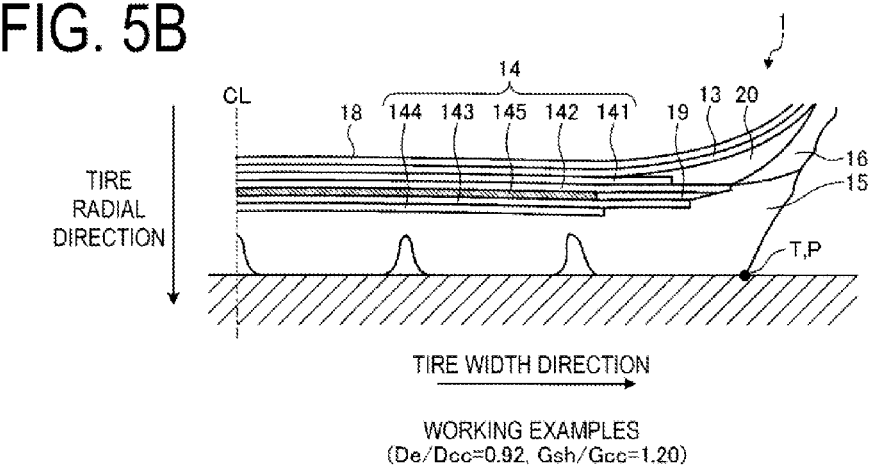

FIGS. 5A and 5B are explanatory views illustrating the effect of the pneumatic tire depicted in FIG. 1. In these drawings, the tire is depicted as having the ratio De/Dcc and the ratio Gsh/Gcc, which are different from each other, in a state of ground contact.

The tire of the comparative example illustrated in FIG. 5A has the configuration depicted in FIGS. 1 to 3, with the ratio De/Dcc being set with both values equal (De/Dcc=1.00) and the ratio Gsh/Gcc being set small (Gsh/Gcc=1.06). According to this configuration, in a state where the tire is not in contact with the ground, the tread profile has a shoulder dropping shape (not indicated) in which the outer diameter reduces from the tire equatorial plane CL toward the tread edge P. For this reason, when the tire is in contact with the ground, then as illustrated in FIG. 5A, a large amount of deformation occurs on the road contact side of the shoulder region in the tread portion (the outer side in the tire radial direction). Here, given that the distances Dcc, De from the circumferential reinforcing layer 145 to the wear end surface WE are uniform (De/Dcc=1.00), the end portion of the circumferential reinforcing layer 145 is greatly distorted on the road contact side (the outer side in the tire radial direction) as the shoulder region of the tread portion is deformed. As a result, the strain on the circumferential reinforcing layer 145 is great when the tire comes into contact with the ground.

In contrast, the tire of Working Example depicted in FIG. 5B has the configuration of FIGS. 1 to 3 with the ratio De/Dcc being set small (De/Dcc=0.92) and the ratio Gsh/Gcc being set large (Gsh/Gcc=1.20). According to this configuration, when the tire is not in a state of contact with the ground, there is a small difference in diameter between the outer diameter at the tire equatorial plane CL and the outer diameter at the tread edge P in the tread profile, with the tread profile having an overall shape that is flat (substantially planar along the tire rotational axis) (see FIG. 1 and FIG. 2). As a result, and as depicted in FIG. 5B, the shoulder region of the tread portion experiences a small amount of deformation when the tire comes into contact with the ground. Furthermore, the distances Dcc, De from the circumferential reinforcing layer 145 to the wear end surface WE have a relationship such that De<Dcc. Thus, when the tire comes into contact with the ground, the circumferential reinforcing layer 145 has an overall flat shape when the end portion of the circumferential reinforcing layer 145 is distorted along with the deformation of the shoulder region of the tread portion. In this manner, the strain of the circumferential reinforcing layer 145 is reduced when the tire comes into contact with the ground.

As described above, the configuration of FIG. 5B has, in comparison to the configuration of FIG. 5A, a small amount of deformation in the shoulder region of the tread portion, and a small amount of strain on the circumferential reinforcing layer 145 when the tire comes into contact with the ground. As a result, the amount of slippage of the land section 3 in the center region and the amount of slippage of the shoulder land section 3 are averaged when the tire is in contact with the ground, which suppresses uneven wear of the shoulder land section 3.

Further still, in the configuration of FIG. 5B, given the configuration of FIG. 4, the shoulder land section 3 has the second profile PL2 which protrudes toward the inner side in the tire radial direction within the ground contact surface. In addition, the distance d between the profiles PL1, PL2 within the ground contact surface of the shoulder land section 3 increases as it approaches the outer side in the tire width direction. According to this configuration, the ground contact pressure increases on the side of the contact edge T of the shoulder land section 3 when the tire comes into contact with the ground. Also, the amount of slippage of the center region of the land section 3 and the amount of slippage of the shoulder land section 3 are averaged when the tire comes into contact with the ground. As a result, uneven wear is effectively suppressed in the shoulder land section 3.

Round Shaped Shoulder Portion

FIG. 6 is an explanatory view of a modified example of the pneumatic tire depicted in FIG. 1. FIG. 6 illustrates a configuration having a shoulder portion with a round shape.

In the configuration in FIG. 1, the shoulder portion has a square shape, in which the tire ground contact edge T and tread edge P are in accord, as illustrated in FIG. 2.

However, the shoulder portion is not limited as such, and may also have a round shape, as illustrated in FIG. 6. In such a case, an intersection P' is taken from the tread portion profile and the side wall portion profile when viewed as a cross-section in the tire meridian direction, and the tread edge P is taken as the bottom of a perpendicular line drawn from the intersection P' to the shoulder portion. Therefore, the tire ground contact edge T and the tread edge P normally are in mutually different locations.

Additional Data

Additionally in the pneumatic tire 1, in FIG. 1, the tread width TW and the width Ws of the circumferential reinforcing layer 145 preferably have a relationship such that $0.70 \leq Ws/TW \leq 0.90$.

The tread width TW is a distance in the direction of the tire rotational axis between the left and right tread ends P, P measured when the tire is mounted on a specified rim, inflated to the specified inner pressure, and is in an unloaded state.

The width Ws of the circumferential reinforcing layer 145 is a distance between the left and right end portions of the circumferential reinforcing layer 145 in the tire rotational axis direction as measured when the tire is mounted on a specified rim, inflated to the specified inner pressure, and is in an unloaded state. In addition, in a situation where the circumferential reinforcing layer 145 has a configuration that is split along the tire width direction (not illustrated), then the width Ws of the circumferential reinforcing layer 145 is the distance between the outermost end portions of each split portion.

Moreover, a typical pneumatic tire has a left-right symmetrical structure centered on the tire equatorial plane CL, as illustrated in FIG. 1. As a result, the distance from the tire equatorial plane CL to the tread edge P is TW/2, and the distance from the tire equatorial plane CL to the circumferential reinforcing layer 145 is Ws/2.

In contrast, in a pneumatic tire having a left-right asymmetrical structure (not illustrated), the range of the ratio Ws/TW between the width Ws of the circumferential reinforcing layer and the above-described tread width TW is stipulated by conversion to half width based on the tire equatorial plane CL. Specifically, the distance TW' (not illustrated) from the tire equatorial plane CL to the tread edge P and the distance Ws' (not illustrated) from the tire equatorial plane CL to the end portion of the circumferential reinforcing layer 145 are set so as to satisfy the relationship $0.70 \leq Ws'/TW' \leq 0.90$.

In addition, as illustrated in FIG. 1, the tread width TW and a total tire width SW preferably have a relationship such that $0.79 \leq TW/SW \leq 0.89$.

The total tire width SW refers to a linear distance (including all portions such as letters and patterns on the tire side surface) between the side walls when the tire is mounted on a specified rim, inflated to the specified inner pressure, and is in an unloaded state.

In addition, in FIG. 1 and FIG. 2, a ground contact width Wsh of each shoulder land section 3 and the tread width TW preferably have a relationship such that $0.1 \leq Wsh/TW \leq 0.2$. This provides an appropriate ground contact width Wsh for the shoulder land section 3.

The ground contact width is measured as a maximum linear distance in the tire axial direction of a contact surface between the tire and a flat plate, in a configuration where the tire is mounted on a specified rim, inflated to the specified inner pressure, placed perpendicularly to the flat plate while in a static state, and has a load applied that corresponds to the specified load.

In addition, as illustrated in FIG. 2, a distance Hcc from the circumferential reinforcing layer 145 to the tread profile and a distance He from the end portion of the circumferential reinforcing layer 145 to the tread profile, each in the tire equatorial plane CL, preferably have a relationship such that $He/Hcc \leq 0.97$. The lower limit of the ratio He/Hcc is not particularly limited. However, the lower limit is restricted by relationship to a tire groove depth. For example, the lower limit of the ratio He/Hcc is preferably within a range such that $0.80 \leq He/Hcc$.

The distance Hcc and the distance He are each measured with the tire mounted on a specified rim, inflated to the specified inner pressure, and is in an unloaded state. Additionally, the measurement point on the circumferential reinforcing layer 145 side is defined by a curve connecting the center points of the belt cords that constitute the circumferential reinforcing layer 145, when viewed as the cross-section taken along the tire meridian direction. Moreover, the end portion of the circumferential reinforcing layer 145 is defined using the belt cord on the outermost side in the tire width direction among the belt cords that constitute the circumferential reinforcing layer 145.

In addition, in FIG. 1, a width Wb2 of a wide-width cross belt 142 and a cross-sectional width Wca of the carcass layer 13 preferably have a relationship such that $0.74 \leq Wb2/Wca \leq 0.89$, and are more preferably within a range such that $0.78 \leq Wb2/Wca \leq 0.83$.

A width Ws of the circumferential reinforcing layer 145 and the cross-sectional width Wca of the carcass layer 13 preferably have a relationship such that $0.60 \leq Ws/Wca \leq 0.70$.

In addition, the tread width TW and the cross-sectional width Wca of the carcass layer 13 preferably have a relationship such that $0.82 \leq TW/Wca \leq 0.92$.

The cross-sectional width Wca of the carcass layer 13 refers to a linear distance between the left and right maximum width positions of the carcass layer 13 when the tire is mounted on a specified rim, inflated to the specified inner pressure, and is in an unloaded state.

In addition, in FIG. 3, a width Wb3 of a narrower cross belt 143 and the width Ws of the circumferential reinforcing layer 145 preferably have a relationship such that $0.75 \leq Ws/Wb3 \leq 0.90$. As a result, the width Ws of the circumferential reinforcing layer 145 can be properly secured.

Also, as illustrated in FIG. 3, the circumferential reinforcing layer 145 is preferably disposed inward in the tire width direction from the left and right edge portions of the narrower cross belt 143 of the pair of cross belts 142, 143. Additionally, the width Wb3 of the narrower cross belt 143 and the distance S from the edge portion of the circumferential reinforcing layer 145 to the edge portion of the narrower cross belt 143 is preferably in a range of $0.03 \leq S/Wb3 \leq 0.12$. As a result, the distance between the end portions of the width Wb3 of the cross belt 143 and the end portions of the circumferential reinforcing layer 145 are properly secured. This point is the same in situations where the circumferential reinforcing layer 145 has a split structure (not illustrated).

The distance S of the circumferential reinforcing layer 145 is measured as a distance in the tire width direction when the tire is mounted on a specified rim, inflated to the specified inner pressure, and is in an unloaded state.

Furthermore, in the configuration of FIG. 1, the circumferential reinforcing layer 145 is constituted by a single steel wire wound in a spiral manner, as illustrated in FIG. 3. However, the configuration is not limited thereto, and the circumferential reinforcing layer 145 may also be configured by a plurality of wires wound spirally around side-by-side to each other (multiple winding structure). In this case, the number of wires is preferably five or less. Additionally, the width of winding per unit when five wires are wound in multiple layers is preferably not more than 12 mm. As a result, a plurality of wires (not less than two and not more than five wires) may be wound properly at a slant within a range of $\pm 5°$ with respect to the tire circumferential direction.

Furthermore, in the pneumatic tire 1, the width Wb1 of the large-angle belt 141 and the width Wb3 of the narrower cross belt 143 among the pair of cross belts 142, 143 preferably have a relationship such that $0.85 \leq Wb1/Wb3 \leq 1.05$ (see FIG. 3). As a result, the ratio Wb1/Wb3 is made appropriate.

The width Wb1 of the large-angle belt 141 and the width Wb3 of the cross belt 143 are measured as the respective distances in the tire width direction when the tire is mounted on a specified rim, inflated to the specified inner pressure, and is in an unloaded state.

In the configuration of FIG. 1, the belt layer 14 has a structure with left-right symmetry centered on the tire equatorial plane CL as illustrated in FIG. 3, and the width Wb1 of the large-angle belt 141 and the width Wb3 of the narrower cross belt 143 have a relationship such that Wb1<Wb3. As a result, an edge portion of the large-angle belt 141 is disposed closer to an inner side in the tire width direction than the edge portion of the narrower cross belt 143 in a region on one side of the tire equatorial plane CL. However, the configuration is not limited thereto, and the width Wb1 of the large-angle belt 141 and the width Wb3 of the narrower cross belt 143 may have a relationship such that Wb1≥Wb3 (not illustrated).

In addition, a diameter Ya at a maximum height position of the carcass layer 13, a diameter Yc at a maximum width position of the carcass layer 13, and a diameter Yd of the carcass layer 13 at the position of the end portion of the circumferential reinforcing layer 145 have relationships such that $0.80 \leq Yc/Ya \leq 0.90$ and $0.95 \leq Yd/Ya \leq 1.02$ in FIG. 1. As a result, the shape of the carcass layer 13 is made appropriate.

The diameter Ya of the maximum height position of the carcass layer 13 is measured as a distance from the tire rotational axis to the intersection of the tire equatorial plane CL and the carcass layer 13 when the tire is mounted on the specified rim, inflated to the specified inner pressure, and is in an unloaded state.

The diameter Yc of the maximum width position of the carcass layer 13 is measured as a distance from the tire rotational axis to the maximum width position of the carcass layer 13 when the tire is mounted on the specified rim, inflated to the specified inner pressure, and is in an unloaded state.

The diameter Yd of the carcass layer 13 at the position of the end portion of the circumferential reinforcing layer 145 is measured as a distance from the tire rotational axis to a point Q3 (not illustrated), where the point Q3 is the intersection of the carcass layer 13 and a straight line drawn in the tire radial direction from the end portion of the circumferential reinforcing layer 145, when the tire is mounted on the specified rim, inflated to the specified inner pressure, and is in an unloaded state.

In addition, in FIG. 1, an actual tire ground contact width Wg (not illustrated) and the cross-sectional width wca of the carcass layer 13 preferably have a relationship such that $0.64 \leq Wg/Wca \leq 0.84$. As a result, the ratio Wg/Wca of the actual tire ground contact width Wg and the cross-sectional width Wca of the carcass layer 13 is made appropriate.

The actual tire ground contact width Wg is calculated as the difference between the overall tire ground contact width and the sum of the groove widths of all the circumferential main grooves 2.

In addition, the belt cords of the large-angle belt 141 are steel wires. The large-angle belt 141 preferably has a quantity of ends that is not less than 15 ends/50 mm and not more than 25 ends/50 mm. Moreover, the belt cords of the pair of cross belts 142, 143 are constituted by steel wires, and the quantity of ends in the pair of cross belts 142, 143 is preferably not less than 18 ends/50 mm and not more than 28 ends/50 mm, and more preferably is not less than 20 ends/50 mm and not more than 25 ends/50 mm. Also, the belt cords that constitute the circumferential reinforcing layer 145 are steel wires, and the quantity of ends in the circumferential reinforcing layer 145 is preferably not less than 17 ends/50 mm and not more than 30 ends/50 mm. As a result, the respective strengths of the belt plies 141, 142, 143, 145 are properly secured.

In addition, a modulus E1 of the coating rubber of the large-angle belt 141 at 100% elongation and a modulus Es of the coating rubber of the circumferential reinforcing layer 145 at 100% elongation preferably have a relationship such that 0.90≤Es/E1≤1.10. Moreover, moduli E2, E3 at 100% elongation of the respective coating rubbers of the pair of cross belts 142, 143, and the modulus Es at 100% elongation of the coating rubber of the circumferential reinforcing layer 145 preferably have a relationship such that 0.90≤Es/E2≤1.10 and 0.90≤Es/E3≤1.10. Moreover, the modulus Es at 100% elongation of the coating rubber of the circumferential reinforcing layer 145 is preferably within the range of 4.5 MPa≤Es≤7.5 MPa. As a result, the respective moduli of the belt plies 141, 142, 143, 145 are made appropriate.

The modulus at 100% elongation is measured in a tensile test at ambient temperature in conformity with JIS-K6251 (using dumbbell no. 3).

In addition, a breaking elongation λ1 of the coating rubber of the large-angle belt 141 is preferably within a range of λ1≥200%. Moreover, respective breaking elongations λ2, λ3 of the coating rubbers of the pair of cross belts 142, 143 are preferably in ranges of λ2≥200% and λ3≥200%. Furthermore, a breaking elongation λs of the coating rubber of the circumferential reinforcing layer 145 is preferably in a range of λs≥200%. As a result, the respective durability of the belt plies 141, 142, 143, 145 is properly secured.

Breaking elongation is measured by performing a tensile test on a test sample of the JIS-K7162 specification 1B shape (dumbbell shape with a thickness of 3 mm) using a tensile tester (INSTRON5585H manufactured by Instron Corp.) conforming to JIS-K7161 at a pulling speed of 2 mm/min.

Elongation of the belt cords, as tire components, which constitute the circumferential reinforcing layer 145 is preferably not less than 1.0% and not more than 2.5% when the tensile load is from 100 to 300 N, and elongation of the belt cords when from a tire (when removed from a tire) is preferably not less than 0.5% and not more than 2.0% when the tensile load is from 500 to 1000 N. The belt cords (high elongation steel wire) have a better elongation ratio than normal steel wire when a low load is applied. The belt cords are thus able to withstand the loads that are applied to the circumferential reinforcing layer 145 during the time from manufacture until the tire is used, which is preferably in suppressing damage to the circumferential reinforcing layer 145.

The elongation of the belt cords is measured in accordance with JIS-G3510.

Additionally, in the pneumatic tire 1, the breaking elongation of the tread rubber 15 is preferably in a range that is equal to or greater than 350%. As a result, the strength of the tread rubber 15 is assured and the occurrence of tears in the outermost circumferential main groove 2 is suppressed. Furthermore, the upper limit of the breaking elongation of the tread rubber 15 is not particularly limited. However, the upper limit is constrained by the type of rubber compound of the tread rubber 15.

Additionally, in this pneumatic tire 1, the hardness of the tread rubber 15 is preferably in a range that is equal to or greater than 60. This ensures an appropriate strength of the tread rubber 15. Furthermore, the upper limit of the hardness of the tread rubber 15 is not particularly limited. However, the upper limit is constrained by the type of rubber compound of the tread rubber 15.

Here, the term rubber hardness refers to JIS-A hardness in accordance with JIS-K6263.

In addition, in this pneumatic tire 1, a loss tangent tan δ of the tread rubber 15 is preferably within a range of 0.10≤tan δ.

The loss tangent tan δ is measured by using a viscoelastic spectrometer under conditions of a temperature of 20° C., a shearing strain of 10%, and a frequency of 20 Hz.

Belt Cushion

As illustrated in FIG. 2, the pneumatic tire 1 includes a belt cushion 20. The belt cushion 20 is disposed so as to be interposed between the carcass layer 13 and the end portion of the cross belt 142 on the inner side in the tire radial direction of the pair of cross belts 142, 143. For example, in the configuration in FIG. 2, an end portion of the belt cushion 20 on the outer side in the tire radial direction is inserted between the carcass layer 13 and the end portion of the cross belt 142, and abuts the edge portion of the large-angle belt 141. Additionally, the belt cushion 20 extends inward in the tire radial direction along the carcass layer 13 and is disposed so as to be interposed between the carcass layer 13 and a side wall rubber 16. Moreover, a pair of left and right belt cushions 20 are respectively disposed at the left and right side wall portions of the tire.

Additionally, a modulus Ebc of the belt cushion 20 at 100% elongation satisfies a range of 1.5 MPa≤Ebc≤3.0 MPa. Given that the modulus Ebc of the belt cushion 20 satisfies such a range, the belt cushion 20 exhibits a stress relief effect, thereby suppressing separation of the periphery rubber at the end portions of the cross belt 142.

Moreover, a breaking elongation λbc of the belt cushion 20 satisfies a range of λbc≥400%. This ensures an appropriate durability of the belt cushion 20.

Belt Edge Cushion Two-Color Structure

Figure 7:
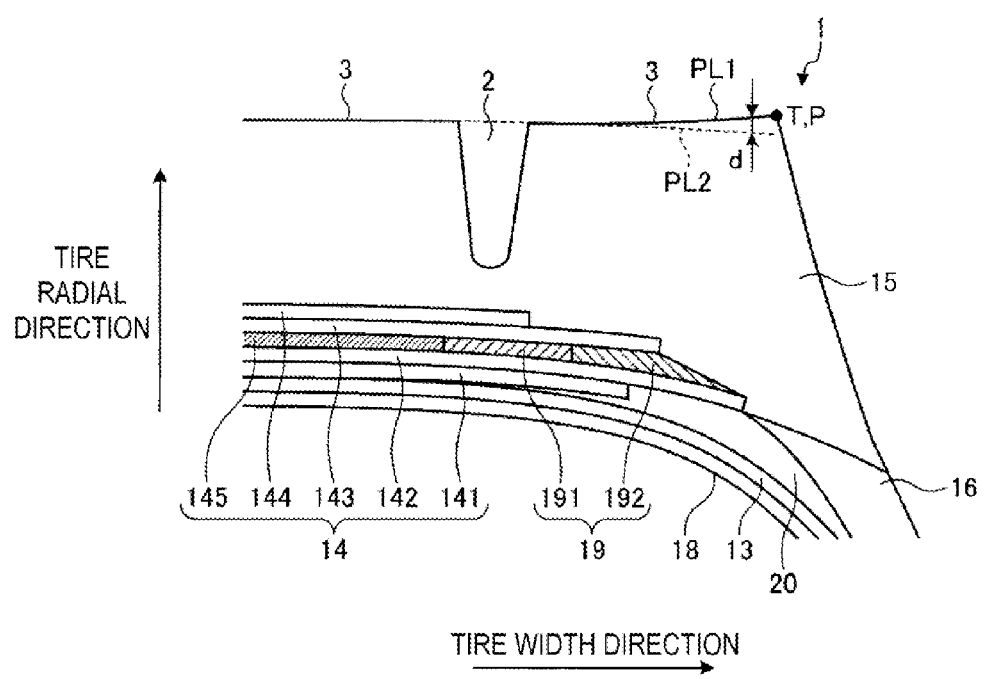
FIG. 7 is an explanatory view illustrating a modified example of the pneumatic tire depicted in FIG. 1.

FIG. 7 is an explanatory view of a modified example of the pneumatic tire depicted in FIG. 1. FIG. 7 is an enlarged view of an end portion of the belt layer 14 on the outer side in the tire width direction. The circumferential reinforcing layer 145 and the belt edge cushion 19 in FIG. 7 are indicated by hatching.

In the configuration illustrated in FIG. 1, the circumferential reinforcing layer 145 is disposed closer to the inside, in the tire width direction, than the left and right edge portions of the narrower cross belt 143 of the pair of cross belts 142, 143. A belt edge cushion 19 is disposed so as to be sandwiched between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than those of the coating rubber of the cross belts 142, 143. Specifically, the modulus E at 100% elongation of the belt edge cushion 19 and a modulus Eco of the coating rubber have a relationship such that 0.60≤E/Eco≤0.95. As a result, there is an advantage such that the occurrence of separation of rubber materials between the pair of cross belts 142, 143 in a region on the outer side in the tire width direction of the circumferential reinforcing layer 145 is suppressed.

Conversely, according to the configuration illustrated in FIG. 7, the belt edge cushion 19 in the configuration illustrated in FIG. 1 has a two-color structure composed of a stress relief rubber 191 and an edge portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145. The edge portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191. Therefore, as viewed in a cross-section from the tire meridian direction, the belt edge cushion 19 has a structure composed by disposing the stress relief rubber 191 and the edge portion relief rubber 192 side by side in the tire width direction to fill a region from the end portion of the circumferential reinforcing layer 145 on the outer side in the tire width direction to the edge portion of the pair of cross belts 142, 143.

Additionally, a modulus Ein at 100% elongation of the stress relief rubber 191 and the modulus Es at 100% elongation of the coating rubber of the circumferential reinforcing layer 145 have a relationship satisfying Ein≤Es in the configuration in FIG. 7. Specifically, the modulus Ein of the stress relief rubber 191 and the modulus Es of the circumferential reinforcing layer 145 preferably have a relationship such that 0.6≤Ein/Es≤0.9.

Moreover, in the configuration illustrated in FIG. 7, the modulus Ein at 100% elongation of the stress relief rubber 191 and a modulus Eco at 100% elongation of the coating rubber of the cross belts 142, 143 have a relationship satisfying Ein≤Eco. Specifically, the modulus Ein of the stress relief rubber 191 and the modulus Eco of the coating rubber preferably have a relationship such that 0.6≤Ein/Eco≤0.9.

Additionally, a modulus Eout at 100% elongation of the edge portion relief rubber 192 and the modulus Ein at 100% elongation of the stress relief rubber 191 preferably have a relationship satisfying Eout<Ein in the configuration in FIG. 7. Additionally, the modulus Ein of the stress relief rubber 191 at 100% elongation is preferably within a range such that 4.0 MPa≤Ein≤5.5 MPa.

Given that the stress relief rubber 191 is disposed on the outer side of the circumferential reinforcing layer 145 in the tire width direction in the configuration illustrated in FIG. 7, shearing strain of the peripheral rubbers is alleviated between the edge portions of the circumferential reinforcing layer 145 and the cross belts 142, 143. Moreover, since the edge portion relief rubber 192 is disposed at a position corresponding to the edge portions of the cross belts 142, 143, shearing strain of the periphery rubbers is alleviated at the edge portions of the cross belts 142, 143. Accordingly, separation of the periphery rubber of the circumferential reinforcing layer 145 is suppressed.

Chamfered Portions of Shoulder Land Section

Figure 8:
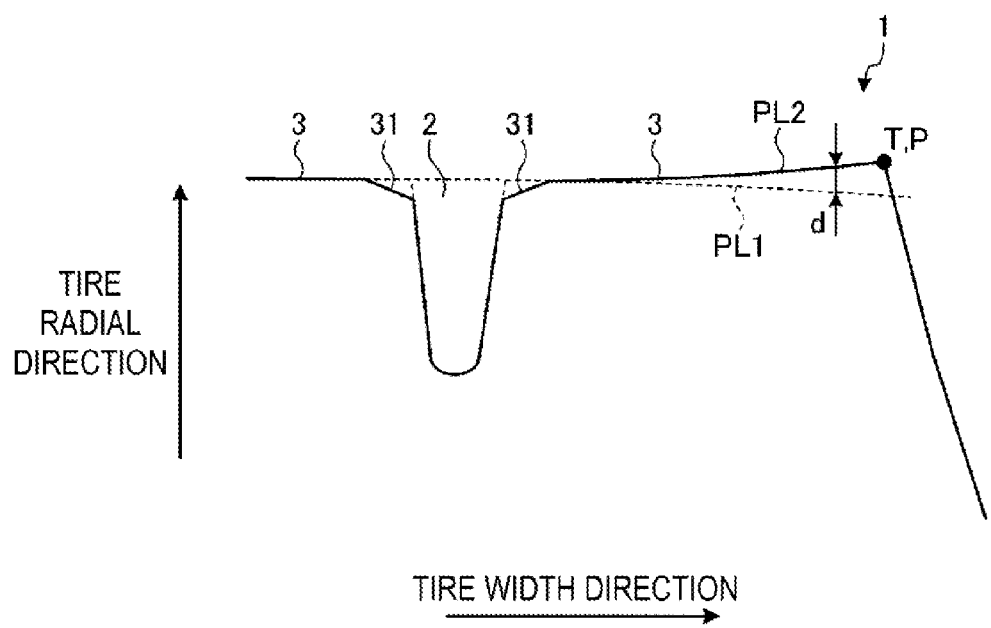
FIG. 8 is an explanatory view illustrating a modified example of the pneumatic tire depicted in FIG. 1.

FIG. 8 is an explanatory view illustrating a modified example of the pneumatic tire depicted in FIG. 1. FIG. 8 illustrates an enlarged cross-section of the shoulder land section.

As illustrated in FIG. 8, the land sections 3 on the outermost side in the tire width direction preferably have a chamfered portions 31 at an edge portion on the circumferential main groove 2 sides in the pneumatic tire 1. The chamfered portions 31 may be formed by corner chamfering or round chamfering that is performed continuously in the tire circumferential direction along the circumferential main grooves 2, or may be formed as notches that are formed discontinuously in the tire circumferential direction.

For example, in the configuration in FIG. 8, the left and right land sections 3, 3 partitioned by the outermost circumferential main groove 2 are ribs, and both have chamfered portions 31 on the respective edge portions of the outermost circumferential main groove 2 sides. The chamfered portions 31 are corner chamfering and are formed continuously in the tire circumferential direction.

Effects

As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIG. 1). In addition, the pneumatic tire 1 is equipped with at least three circumferential main grooves 2 that extend in the tire circumferential direction, and a plurality of land sections 3 that is partitioned and formed by these circumferential main grooves 2. Also, the belt layer 14 is formed by laminating the pair of cross belts 142, 143 each having a belt angle of not less than 10° and not more than 45° as an absolute value and having belt angles of mutually opposite signs, and the circumferential reinforcing layer 145 having a belt angle within a range of ±5° with respect to the tire circumferential direction (see FIG. 2). In addition, in the cross-sectional view taken along the tire meridian direction, the land section 3 located closer to the inner side in the tire width direction than the left and right outermost circumferential main grooves 2, 2 has the first profile PL1 that protrudes toward the outer side in the tire radial direction (see FIG. 4). In addition, the shoulder land section 3, located closer to the outer side than the left and right outermost circumferential main grooves in the tire width direction, has the second profile PL2, which protrudes toward the inner side in the tire radial direction within a ground contact surface. In addition, the distance d in the tire radial direction between the line extending from the first profile PL1 in the ground contact surface of the shoulder land section 3 and the second profile PL2 increases toward the outer side in the tire width direction.

According to this configuration, the shoulder land section 3 has the second profile PL2, which protrudes toward the inner side in the tire radial direction within the ground contact surface. In addition, given that the distance d between the first profile PL1 and the second profile PL2 within the ground contact surface of the shoulder land section 3 increases toward the outer side in the tire width direction, the ground contact pressure on the side of the contact edge T of the shoulder land section 3 increases when the tire comes into contact with the ground. As such, an amount of slippage at a center region of the land section 3 and an amount of slippage of the shoulder land section 3 are averaged when the tire comes into contact with the ground. As a result, this has an advantage in that uneven wear of the shoulder land section 3 is suppressed, which improves the uneven wear resistance performance of the tire.

In addition, in this pneumatic tire 1, as seen in a cross-sectional view taken along the tire meridian direction, when a line is drawn along the wear end surface WE of the circumferential main groove 2, the distance Dcc from the circumferential reinforcing layer 145 to the wear end surface WE and the distance De from the end portion of the circumferential reinforcing layer 145 to the wear end surface WE, in the tire equatorial plane CL, have a relationship such that De/Dcc≤0.94 (see FIG. 2). According to this configuration, given that the distances Dcc, De of the circumferential reinforcing layer 145 with respect to the wear end surface WE have been made appropriate, the strain on the circumferential reinforcing layer 145 is reduced when the tire comes into contact with the ground (compare FIGS. 5A and 5B). Accordingly, there is an advantage in that separation of the peripheral rubber of the circumferential reinforcing layer 145 is suppressed.

In addition, in this pneumatic tire 1, the distance Gcc from the tread profile to the tire inner circumferential surface and the distance Gsh from the tread edge P to the tire inner circumferential surface in the tire equatorial plane CL have a relationship such that 1.10≤Gsh/Gcc (see FIG. 2). According to this configuration, the tread profile has an overall flat shape when the tire is not in a state of contact with the ground (see FIG. 1 and FIG. 2). As such, an amount of deformation in the shoulder region of the tread portion when the tire comes into contact with the ground is reduced (compare FIGS. 5A and 5B). Accordingly, there is an advantage in that separation of the peripheral rubber of the circumferential reinforcing layer 145 is effectively suppressed. In addition, there is an advantage in that repeating strain at the end portion of the circumferential reinforcing layer 145 while the tire is rolling is reduced, and in that rupturing of the belt cords of the circumferential reinforcing layer 145 is suppressed.

In addition, in this pneumatic tire 1, the diameter D1 of the first profile PL1 in the tire equatorial plane CL and the diameter D2 of the second profile PL2 at the tire ground contact edge T have a relationship such that −0.015≤(D1−D2)/D1≤0.015 (see FIG. 4). As a result, there is an advantage in that the amount of shoulder dropping at the tire ground contact edge T is made appropriate, and in that the amount of slippage of the land section 3 in the center region and the amount of slippage of the shoulder land section 3 are averaged when the tire comes into contact with the ground.

In addition, in this pneumatic tire 1, the diameter D2 of the second profile PL2 at the tire ground contact edge T and the diameter D3 of the second profile PL2 at the edge portion of the shoulder land section 3 at the inner side in the tire width direction have a relationship such that D3≤D2 (see FIG. 4). As a result, the profile shape of the shoulder land section 3 is made appropriate.

Moreover, in the pneumatic tire 1, a width Ws of the circumferential reinforcing layer 145 and a width Wca of the carcass layer 13 have a relationship such that 0.60≤Ws/Wca≤0.70 (see FIG. 1). As a result, there is an advantage in that the ratio Ws/Wca between the width Ws of the circumferential reinforcing layer 145 and the width Wca of the carcass layer 13 is made appropriate. That is, given that 0.60≤Ws/Wca, the function of the circumferential reinforcing layer 145 is appropriately secured. In addition, given that Ws/Wca≤0.70, fatigue rupture of the belt cords is suppressed at the edge portion of the circumferential reinforcing layer 145.

In addition, in this pneumatic tire 1, the diameter Ya of the maximum height position of the carcass layer 13 and the diameter Yc of the maximum width position of the carcass layer 13 have a relationship such that 0.80≤Yc/Ya≤0.90 (see FIG. 1). As a result, there is an advantage in that the shape of the carcass layer 13 is made appropriate.

Additionally, in the pneumatic tire 1, the diameter Ya at the maximum height position of the carcass layer 13 and the diameter Yd of the carcass layer 13 at the position of the end portion of the circumferential reinforcing layer 145 have a relationship such that 0.95≤Yd/Ya≤1.02 (see FIG. 1). Accordingly, there is an advantage in that the shape of the carcass layer 13 is made appropriate, and the amount of deformation of the carcass layer 13 is reduced in the disposition region of the circumferential reinforcing layer 145 when the tire makes contact with the ground. That is, given that 0.95≤Yd/Ya, the amount of the deformation in the carcass layer 13 is reduced in the disposition region of the circumferential reinforcing layer 145 when the tire makes contact with the ground. In addition, given that Yd/Ya≤1.02, the tire shape is appropriately ensured.

In addition, in this pneumatic tire 1, the width Wb2 of the wide-width cross belt 142 and the cross-sectional width Wca of the carcass layer 13 have a relationship such that 0.74≤Wb2/Wca≤0.89 (see FIG. 1). As a result, there is an advantage in that the width Wb2 of the wide-width cross belt 142 is made appropriate, and the stiffness of the tread portion is secured.

Furthermore, in the pneumatic tire 1, the belt layer 14 includes the large-angle belt 141 having a belt angle having an absolute value of not less than 45° and not more than 70° (see FIG. 1 and FIG. 3). As a result, there is an advantage in that the belt layer 14 is reinforced and the strain of the end portions of the belt layer 14 when the tire makes contact with the ground is suppressed.

Additionally, the width Wb1 of the large-angle belt 141 and the width Wb3 of the narrower cross belt 143 of the pair of cross belts 142, 143 have the relationship satisfying 0.85≤Wb1/Wb3≤1.05 in the pneumatic tire 1 (see FIG. 3). According to this configuration, the ratio Wb1/Wb3 between the width Wb1 of the large-angle belt 141 and the width Wb3 of the narrower cross belt 143 is made appropriate. As a result, there is an advantage in that distortion of the end portions of the belt layer 14 when the tire is in contact with the ground is suppressed.

In addition, in this pneumatic tire 1, the ground contact width Wsh of the shoulder land section 3 and the tread width TW have a relationship such that 0.1≤Wsh/TW≤0.2 (see FIG. 1 and FIG. 2). According to such a configuration, there is an advantage in that the ground contact width Wsh of the shoulder land section 3 is made appropriate. That is, given that 0.1≤Wsh/TW, the grounding area of the shoulder land section 3 is ensured and uneven wear resistance performance of the tire is ensured. Also, given that Wsh/TW≤0.2, the ground contact surface pressure of the shoulder land section 3 while the tire is in contact with the ground is increased, which leads to an improvement in the wet performance of the tire.

In addition, in this pneumatic tire 1, the actual ground contact width Wg (not illustrated) of the tire and the cross-sectional width Wca of the carcass layer 13 have a relationship such that 0.64≤Wg/Wca≤0.84 (see FIG. 1). As a result, there is an advantage in that the cross-sectional width Wca of the carcass layer 13 is made appropriate. That is, given that 0.64≤Wg/Wca, the grounding area of the tire is appropriately secured. In addition, given that Wg/Wca≤0.84, the tread width TW is formed so as not to be excessively large, and the ground contact surface pressure of the shoulder land section 3 is secured appropriately.

In addition, in this pneumatic tire 1, the tread width TW and the total tire width SW have a relationship such that 0.79≤TW/SW≤0.89 (see FIG. 1). In such a configuration, radial growth in the center region is suppressed due to the belt layer 14 having the circumferential reinforcing layer 145. Furthermore given that the ratio TW/SW is within the above-described range, a difference in radial growth between the center region and a shoulder region is alleviated. This has an advantage in that the contact pressure distribution of the tire is made uniform. Specifically, given that 0.79≤TW/SW, the air volume inside the tire is secured and deformation is suppressed. Moreover, given that TW/SW≤0.89, rising of the shoulder portion is suppressed and deformation is suppressed when the tire comes into contact with the ground.

Additionally, in this pneumatic tire 1, the tread width TW and a cross-sectional width Wca of the carcass layer 13 have a relationship such that 0.82≤TW/Wca≤0.92 (see FIG. 1). In such a configuration, radial growth in the center region is suppressed due to the belt layer 14 having the circumferential reinforcing layer 145. Furthermore, given that the ratio TW/Wca is within the above-described range, a difference in radial growth between the center region and a shoulder region is alleviated and the contact pressure distribution in the tire width direction is made uniform. This has an advantage in that the contact pressure distribution of the tire is made uniform. Specifically, given that 0.82≤TW/Wca, the air volume inside the tire is secured and deformation is suppressed. Moreover, given that TW/Wca≤0.92, rising of the shoulder portion is suppressed, which in turn makes the contact pressure distribution uniform.

In addition, in this pneumatic tire 1, the rubber hardness of the tread rubber 15 is in a range that is equal to or greater than 60. As a result, there is an advantage in that the strength of the tread rubber 15 is properly secured, and the uneven wear resistance performance of the tire is improved.

Moreover, in the pneumatic tire 1, the shoulder land section 3 has a chamfered portion 31 at an edge portion on the circumferential main groove 2 side (see FIG. 8). As a result, there is an advantage in that the ground contact pressure is reduced at the edge portion of the shoulder land section 3 on the side of the circumferential main groove 2, and the uneven wear resistance performance of the tire is improved.

Also, in the pneumatic tire 1, the belt cords of the circumferential reinforcing layer 145 are steel wire, and the circumferential reinforcing layer 145 has a quantity of ends that is not less than 17 ends/50 mm and not more than 30 ends/50 mm. As a result, there is an advantage in that the quantity of ends of the belt cords of the circumferential reinforcing layer 145 is made appropriate. That is, given that the quantity of ends is at least 17 ends/50 mm, the strength of the circumferential reinforcing layer 145 is properly secured. In addition, given that the quantity of ends is not more than 30 ends/50 mm, the amount of rubber in the coating rubber of the circumferential reinforcing layer 145 is properly secured, and separation of the rubber material between neighboring belt plies (In FIG. 3, between the pair of cross belts 142, 143 and the circumferential reinforcing layer 145) is suppressed.

In addition, in the pneumatic tire 1, the elongation of the belt cords, as tire components, which constitute the circumferential reinforcing layer 145 is preferably not less than 1.0% and not more than 2.5% when the tensile load is from 100 to 300 N. As a result, there is an advantage in that the effect of suppressing radial growth in the center region is properly secured due to the circumferential reinforcing layer 145.

In addition, in the pneumatic tire 1, the elongation of the belt cords, when from a tire, which constitute the circumferential reinforcing layer 145 is not less than 0.5% and not more than 2.0% when the tensile load is from 500 to 1000 N. As a result, there is an advantage in that the effect of suppressing radial growth in the center region is properly secured due to the circumferential reinforcing layer 145.

In addition, in this pneumatic tire 1, the circumferential reinforcing layer 145 is disposed closer to the inner side in the tire width direction than the left and right edge portions of the narrower cross belt 143 of the pair of cross belts 142, 143 (see FIG. 3). Also, the pneumatic tire 1 includes the stress relief rubber 191 disposed between the pair of cross belts 142, 143 and on the outer side of the circumferential reinforcing layer 145 in the tire width direction so as to be adjacent to the circumferential reinforcing layer 145, and the edge portion relief rubber 192 disposed between the pair of cross belts 142, 143 and on the outer side of the stress relief rubber 191 in the tire width direction and at a position corresponding to the edge portion of the pair of cross belts 142, 143 so as to be adjacent to the stress relief rubber 191 (see FIG. 7). In such a configuration, there is an advantage in that fatigue rupture of the peripheral rubber at the edge portion of the circumferential reinforcing layer 145 is suppressed due to the circumferential reinforcing layer 145 being disposed closer to the inner side in the tire width direction than the left and right edge portions of the narrower cross belt 143 of the pair of cross belts 142, 143. Given that the stress relief rubber 191 is disposed on the outer side of the circumferential reinforcing layer 145 in the tire width direction, shearing strain of the peripheral rubber between the edge portion of the circumferential reinforcing layer 145 and the cross belts 142, 143 is alleviated. Moreover, given that the edge portion relief rubber 192 is disposed at a position corresponding to the edge portions of the cross belts 142, 143, shearing strain of the periphery rubbers is alleviated at the edge portions of the cross belts 142, 143. Accordingly, there is an advantage in that separation of the peripheral rubber of the circumferential reinforcing layer 145 is suppressed.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying Ein<Eco. As a result, there is an advantage in that the modulus Ein of the stress relief rubber 191 is made appropriate and that the shearing strain of the periphery rubber is alleviated between the edge portion of the circumferential reinforcing layer 145 and the cross belts 142, 143.

Furthermore, in the pneumatic tire 1, the modulus Ein at 100% elongation of the stress relief rubber 191 and the modulus Eco at 100% elongation of the coating rubber of the pair of cross belts 142, 143 have a relationship such that 0.6≤Ein/Eco≤0.9. As a result, there is an advantage in that the ratio Ein/Eco is made appropriate and the shearing strain of the peripheral rubber between the edge portion of the circumferential reinforcing layer 145 and the cross belts 142, 143 is alleviated.

Additionally, in the pneumatic tire 1, the modulus Ein at 100% elongation of the stress relief rubber 191 is within a range of 4.0 MPa≤Ein≤5.5 MPa (see FIG. 7). As a result, there is an advantage in that the modulus Ein of the stress relief rubber 191 is made appropriate and in that the shearing strain of the periphery rubber is alleviated between the edge portion of the circumferential reinforcing layer 145 and the cross belts 142, 143.

In addition, in the pneumatic tire 1, the circumferential reinforcing layer 145 is disposed closer to the inner side in the tire width direction than the left and right edge portions of the narrower cross belt 143 of the pair of cross belts 142, 143 (see FIG. 3). Also, the width Wb3 of the narrower cross belt 143 and the distance S from the edge portion of the circumferential reinforcing layer 145 to the edge portion of the narrower cross belt 143 are in a range of $0.03 \leq S/Wb3 \leq 0.12$. This has the advantage of providing an appropriate positional relationship S/Wb3 between the edge portions of the cross belts 142, 143 and the edge portions of the circumferential reinforcing layer 145. Specifically, given that $0.03 \leq S/Wb3$, an appropriate distance is ensured between the end portions of the circumferential reinforcing layer 145 and the end portions of the cross belt 143 to suppress the separation of the peripheral rubbers at the end portions of these belt plies 145, 143. Additionally, given that $S/Wb3 \leq 0.12$, the width Ws of the circumferential reinforcing layer 145 relative to the width Wb3 of the cross belt 143 is ensured, such that ensure an appropriate fastening effect is also ensured by the circumferential reinforcing layer 145.

Target of Application

In addition, the pneumatic tire 1 is preferably applied to a heavy duty tire with an aspect ratio of not less than 40% and not more than 70% when mounted on a regular rim, inflated with a regular inner pressure and having a regular load applied. A heavy duty tire has a higher load under use than a passenger car tire. As a result, the difference in the diameters between the disposition region of the circumferential reinforcing layer 145 in the tread surface and the region on the outer side in the tire width direction from the circumferential reinforcing layer 145 may easily increase. Moreover, a ground contact shape having an hourglass shape occurs easily in the tire having the above-mentioned low aspect ratio. As such, given that the heavy duty tire is made the target of application, the above-described effect of improving the uneven wear resistance performance of the tire is remarkably obtained.

EXAMPLES

FIGS. 9A to 12B are tables showing results of performance testing of pneumatic tires according to embodiments of the present technology.

In the performance testing, a plurality of pneumatic tires that differ from each other were evaluated in terms of belt-edge-separation resistance performance (see FIGS. 9A to 12B). In this evaluation, pneumatic tires having a tire size of 315/60 R22.5 were mounted on a rim having a rim size of 22.5×9.00 and inflated with 900 kPa of air pressure. In addition, the pneumatic tires were mounted on the front axle of a testing vehicle that is a 4×2 tractor trailer, and a load of 34.81 kN was applied. Then, upon driving the testing vehicle for 100,000 km, the amount of shoulder dropping wear on the shoulder land section (difference between the amount of wear on the edge portion of the shoulder land section and the amount of wear on the outermost circumferential main groove) was measured, and an evaluation was performed. A larger numerical value is preferable in the evaluations. Specifically, an evaluation of 105 or greater (+5 points or more over the standard value of 100) indicates sufficient superiority over the conventional example, and an evaluation of 110 or greater indicates dramatic superiority over the conventional example.

The pneumatic tires 1 of Working Example 1 have the configuration illustrated in FIGS. 1 to 3. In addition, the belt angle of the cross belts 142, 143 is of ±19°, and the belt angle of the circumferential reinforcing layer 145 is substantially 0°. Furthermore, the main dimensions are TW=275 mm, Gcc=32.8 mm, Dcc=11.2 mm, Hcc=21.3, Ya=446 mm, Wca=320 mm, D2≤D1, and D3≤D2. The pneumatic tires in each of Working Examples 2 to 42 are modified examples of the pneumatic tires of Working Example 1.

The conventional pneumatic tire is not equipped with the circumferential reinforcing layer 145 of FIGS. 1 to 3.

As can be seen from the test results, the pneumatic tires 1 of the Working Examples 1 to 42 demonstrate improved belt-edge-separation resistance performance of the tire. In addition, and particularly in comparing the Working Examples 1 to 9, given $1.20 \leq Gsh/Gcc$ and $De/Dcc \leq 0.92$, and given that the second profile of the shoulder land section 3 protrudes toward the inner side in the tire radial direction within the ground contact surface, a dramatic improvement in the belt-edge-separation resistance performance (an evaluation of at least 105) is clearly obtained.

What is claimed is:

1. A pneumatic tire, comprising:
a carcass layer;
a belt layer disposed on an outer side of the carcass layer in a tire radial direction;
a tread rubber disposed on an outer side of the belt layer in the tire radial direction;
at least three circumferential main grooves extending in a tire circumferential direction; and
a plurality of land sections partitioned and formed by the circumferential main grooves;
the belt layer being formed by laminating a pair of cross belts each having a belt angle with an absolute value of not less than 10° and not more than 45° and having mutually opposite signs, and a circumferential reinforcing layer having a belt angle within a range of ±5° with respect to the tire circumferential direction;
among the circumferential main grooves, the circumferential main grooves that are outermost to a left and right in a tire width direction being termed outermost circumferential main grooves;
in a cross-sectional view taken along a tire meridian direction, one of the land sections that is closer to an inner side in the tire width direction than the outermost circumferential main grooves to the left and right has a first profile that protrudes toward the outer side in the tire radial direction, and another one of the land sections that is closer to an outer side in the tire width direction than the outermost circumferential main grooves to the left and right (hereinafter termed a shoulder land section) has a second profile that protrudes toward an inner side in the tire radial direction within a ground contact surface; and
a distance d in the tire radial direction between a line extending from the first profile within the ground contact surface of the shoulder land section and the second profile increasing toward the outer side in the tire width direction;
wherein a diameter D2 of the second profile at the a tire ground contact edge and a diameter D3 of the second profile at an edge portion of the shoulder land section on the inner side in the tire width direction have a relationship such that D3<D2 or D2=D3.

2. The pneumatic tire according to claim 1, wherein upon a wear end surface WE of the circumferential main grooves being drawn in the cross-sectional view taken along the tire meridian direction,
in a tire equatorial plane, a distance Dcc from the circumferential reinforcing layer to the wear end surface WE and a distance De from an end portion of the circumferential reinforcing layer to the wear end surface WE have a relationship such that $De/Dcc \leq 0.94$.

3. The pneumatic tire according to claim 1, wherein
a diameter D1 of the first profile at a tire equatorial plane and a diameter D2 of the second profile at a tire ground contact edge have a relationship such that $-0.015 \leq (D1-D2)/D1 \leq 0.015$.

4. The pneumatic tire according to claim 1, wherein
a width Ws of the circumferential reinforcing layer and a width Wca of the carcass layer have a relationship such that $0.60 \leq Ws/Wca \leq 0.70$.

5. The pneumatic tire according to claim 1, wherein
a diameter Ya at a maximum height position of the carcass layer and a diameter Yc at a maximum width position of the carcass layer have a relationship such that $0.80 \leq Yc/Ya \leq 0.90$.

6. The pneumatic tire according to claim 1, wherein
a diameter Ya at a maximum height position of the carcass layer and a diameter Yd of the carcass layer at a position on an end portion of the circumferential reinforcing layer have a relationship such that $0.95 \leq Yd/Ya \leq 1.02$.

7. The pneumatic tire according to claim 1, wherein
a width Wb2 of a wide-width one of the cross belts and a cross-sectional width Wca of the carcass layer have a relationship such that $0.74 \leq Wb2/Wca \leq 0.89$.

8. The pneumatic tire according to claim 1, wherein
the belt layer has a large-angle belt having a belt angle with an absolute value of not less than 45° and not more than 70°.

9. The pneumatic tire according to claim 8, wherein
a width Wb1 of the large-angle belt and a width Wb3 of a narrower cross belt of the pair of cross belts have a relationship such that $0.85 \leq Wb1/Wb3 \leq 1.05$.

10. The pneumatic tire according to claim 1, wherein
a ground contact width Wsh of the shoulder land section and a tread width TW have a relationship such that $0.1 \leq Wsh/TW \leq 0.2$.

11. The pneumatic tire according to claim 1, wherein
a tire actual ground contact width Wg and a cross-sectional width Wca of the carcass layer have a relationship such that $0.64 \leq Wg/Wca \leq 0.84$.

12. The pneumatic tire according to claim 1, wherein
a tread width TW and a total tire width SW have a relationship such that $0.79 \leq TW/SW \leq 0.89$.

13. The pneumatic tire according to claim 1, wherein
a tread width TW and a cross-sectional width Wca of the carcass layer have a relationship such that $0.82 \leq TW/Wca \leq 0.92$.

14. The pneumatic tire according to claim 1, wherein
a rubber hardness of the tread rubber is in a range that is equal to or greater than 60.

15. The pneumatic tire according to claim 1, wherein
the shoulder land section has a chamfered portion on an edge portion of a circumferential main groove side.

16. The pneumatic tire according to claim 1, wherein
belt cords of the circumferential reinforcing layer are steel wires, and have a quantity of ends that is not less than 17 ends/50 mm and not more than 30 ends/50 mm.

17. The pneumatic tire according to claim 1, wherein
elongation of belt cords of the circumferential reinforcing layer, the belt cords being tire components, is not less than 1.0% and not more than 2.5% when a tensile load is from 100 to 300 N.

18. The pneumatic tire according to claim 1, wherein
elongation of belt cords of the circumferential reinforcing layer, the belt cords being from a tire, is not less than 0.5% and not more than 2.0%, when a tensile load is from 500 to 1000 N.

19. The pneumatic tire according to claim 1, wherein
the circumferential reinforcing layer is disposed closer to the inner side in the tire width direction than left and right edge portions of a narrower cross belt of the pair of cross belts, the pneumatic tire further comprising:
a stress relief rubber disposed between the pair of cross belts and disposed on an outer side of the circumferential reinforcing layer in the tire width direction so as to be adjacent to the circumferential reinforcing layer; and
an end portion relief rubber disposed between the pair of cross belts and disposed on an outer side of the stress relief rubber in the tire width direction and in a position corresponding to edge portions of the pair of cross belts so as to be adjacent to the stress relief rubber.

20. The pneumatic tire according to claim 19, wherein
a modulus Ein at 100% elongation of the stress relief rubber and a modulus Eco at 100% elongation of a coating rubber of the pair of cross belts have a relationship such that Ein<Eco.

21. The pneumatic tire according to claim 19, wherein
a modulus Ein at 100% elongation of the stress relief rubber and a modulus Eco at 100% elongation of a coating rubber of the pair of cross belts have a relationship such that $0.6 \leq Ein/Eco \leq 0.9$.

22. The pneumatic tire according to claim 19, wherein
a modulus Ein at 100% elongation of the stress relief rubber is in a range such that $4.0 \text{ MPa} \leq Ein \leq 5.5 \text{ Mpa}$.

23. The pneumatic tire according to claim 1, wherein
the circumferential reinforcing layer is disposed closer to the inner side in the tire width direction than the left and right edge portions of a narrower cross belt of the pair of cross belts, and
a width Wb3 of the narrower cross belt and a distance S from the edge portion of the circumferential reinforcing layer to the edge portion of the narrower cross belt are within a range such that $0.03 \leq S/Wb3$.

24. The pneumatic tire according to claim 1, wherein
the pneumatic tire is applied to a heavy duty tire having an aspect ratio that is equal to or less than 70%.

25. The pneumatic tire according to claim 1, wherein the diameters D2 and D3 have a relationship such that $0.0 \text{ mm} \leq D2-D3 \leq 15.0 \text{ mm}$.

26. The pneumatic tire according to claim 1, wherein a tire equatorial plane, a distance Gcc from a tread profile to a tire inner circumferential surface and a distance Gsh from a tread edge to the tire inner circumferential surface have a relationship such that $1.20 \leq Gsh/Gcc$.

27. A pneumatic tire, comprising:
a carcass layer;
a belt layer disposed on an outer side of the carcass layer in a tire radial direction;
a tread rubber disposed on an outer side of the belt layer in the tire radial direction;
at least three circumferential main grooves extending in a tire circumferential direction; and
a plurality of land sections partitioned and formed by the circumferential main grooves;
the belt layer being formed by laminating a pair of cross belts each having a belt angle with an absolute value of not less than 10° and not more than 45° and having mutually opposite signs, and a circumferential reinforcing layer having a belt angle within a range of ±5° with respect to the tire circumferential direction;
among the circumferential main grooves, the circumferential main grooves that are outermost to a left and right in a tire width direction being termed outermost circumferential main grooves;
in a cross-sectional view taken along a tire meridian direction, one of the land sections that is closer to an inner side in the tire width direction than the outermost circumferential main grooves to the left and right has a first profile that protrudes toward the outer side in the tire radial direction, and another one of the land sections that is closer to an outer side in the tire width direction than the outermost circumferential main grooves to the left and right (hereinafter termed a shoulder land section) has a second profile that protrudes toward an inner side in the tire radial direction within a ground contact surface;
a distance d in the tire radial direction between a line extending from the first profile within the ground contact surface of the shoulder land section and the second profile increasing toward the outer side in the tire width direction; and
a diameter D1 of the first profile at the a tire equatorial plane and a diameter D2 of the second profile at a tire ground contact edge having a relationship such that $-0.015 \leq 0.015 \leq (D1-D2)/D1 < 0$.

28. The pneumatic tire according to claim 27, wherein upon a wear end surface WE of the circumferential main grooves being drawn in the cross-sectional view taken along the tire meridian direction, in a tire equatorial plane, a distance Dcc from the circumferential reinforcing layer to the wear end surface WE and a distance De from an end portion of the circumferential reinforcing layer to the wear end surface WE have a relationship such that $De/Dcc \leq 0.94$.

29. The pneumatic tire according to claim 27, wherein a tire equatorial plane, a distance Gcc from a tread profile to a tire inner circumferential surface and a distance Gsh from a tread edge to the tire inner circumferential surface have a relationship such that $1.20 \leq Gsh/Gcc$.

* * * * *